United States Patent
Niu et al.

(10) Patent No.: US 10,743,371 B2
(45) Date of Patent: Aug. 11, 2020

(54) SYNCRHONIZATION SIGNALS FOR MULTEFIRE NARROWBAND INTERNET-OF-THINGS (MF NB-IOT) OPERATION IN UNLICENSED SPECTRUM

(71) Applicants: Huaning Niu, Milpitas, CA (US); Wenting Chang, Beijing (CN); Salvatore Talarico, Sunnyvale, CA (US)

(72) Inventors: Huaning Niu, Milpitas, CA (US); Wenting Chang, Beijing (CN); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 16/242,659

(22) Filed: Jan. 8, 2019

(65) Prior Publication Data
US 2019/0208574 A1 Jul. 4, 2019

Related U.S. Application Data

(60) Provisional application No. 62/623,263, filed on Jan. 29, 2018, provisional application No. 62/625,058, (Continued)

(51) Int. Cl.
*H04B 7/00* (2006.01)
*H04W 88/06* (2009.01)
(Continued)

(52) U.S. Cl.
CPC ......... *H04W 88/06* (2013.01); *H04J 13/0062* (2013.01); *H04L 27/261* (2013.01); (Continued)

(58) Field of Classification Search
USPC .................................................. 370/310, 328
See application file for complete search history.

(56) References Cited

U.S. PATENT DOCUMENTS 10,440,636 B2 * 10/2019 Einhaus ................ H04W 56/00
10,531,459 B2 *  1/2020 Yerramalli ........ H04W 72/0453
(Continued)

OTHER PUBLICATIONS

RAN1 agreement for Rel-13 NB-Io-T, 3GPP, Ericsson, Apr. 2016, pp. 1-28.*
(Continued)

*Primary Examiner* — Dmitry Levitan
(74) *Attorney, Agent, or Firm* — Kowert, Hood, Munyon, Rankin & Goetzel, P.C.

(57) ABSTRACT

Embodiments of an Evolved Node-B (eNB), a MulteFire narrowband internet-of-things User Equipment (MF NB-IoT UE), and methods of communication are described herein. The eNB may transmit an unlicensed narrowband primary synchronization signal (U-NPSS) in a plurality of subframes. The eNB may, for the U-NPSS, for each subframe of the plurality of subframes, and for each of the orthogonal frequency division multiplexing (OFDM) symbols of the subframe: repeat a sequence of length-11; and map the sequence to 11 resource elements (REs) of a physical resource block (PRB) of 12 REs. The eNB may process the U-NPSS by an orthogonal cover code (OCC) over the plurality of subframes. The sequence in each of the OFDM symbols of each of the subframes of the plurality of subframes may be multiplied by a different element of the OCC.

20 Claims, 14 Drawing Sheets

Related U.S. Application Data filed on Feb. 1, 2018, provisional application No. 62/658,263, filed on Apr. 16, 2018, provisional application No. 62/671,798, filed on May 15, 2018, provisional application No. 62/687,705, filed on Jun. 20, 2018, provisional application No. 62/765,197, filed on Aug. 20, 2018.

(51) Int. Cl.
| | |
|---|---|
| *H04W 4/80* | (2018.01) |
| *H04W 16/14* | (2009.01) |
| *H04W 72/04* | (2009.01) |
| *H04J 13/00* | (2011.01) |
| *H04L 27/26* | (2006.01) |
| *H04W 56/00* | (2009.01) |
| *H04W 4/70* | (2018.01) |
| *H04L 5/00* | (2006.01) |

(52) U.S. Cl.
CPC ........... *H04L 27/2607* (2013.01); *H04W 4/70* (2018.02); *H04W 4/80* (2018.02); *H04W 16/14* (2013.01); *H04W 56/001* (2013.01); *H04W 72/0446* (2013.01); *H04L 5/0007* (2013.01)

(56) References Cited

U.S. PATENT DOCUMENTS

| 10,567,206 | B2* | 2/2020 | Wang | H04L 27/2613 |
| 2016/0135179 | A1* | 5/2016 | Yin | H04J 11/0069 |
| | | | | 370/329 |
| 2018/0206241 | A1* | 7/2018 | Matsumoto | H04W 16/14 |
| 2019/0053177 | A1* | 2/2019 | Niu | H04W 56/001 |
| 2019/0208574 | A1* | 7/2019 | Niu | H04W 56/001 |

OTHER PUBLICATIONS

Wang, A Primer on 3GPP Narrowband Internet of Things (NB-IoT), Jun. 2016.*

* cited by examiner

1000

SYNCRHONIZATION SIGNALS FOR MULTEFIRE NARROWBAND INTERNET-OF-THINGS (MF NB-IOT) OPERATION IN UNLICENSED SPECTRUM

PRIORITY

This application claims priority under 35 USC 119(e) to U.S. Provisional Patent Application Ser. No. 62/623,263, filed Jan. 29, 2018, [reference number AA8319-Z], and to U.S. Provisional Patent Application Ser. No. 62/625,058, filed Feb. 1, 2018, [reference number AA8572-Z], and to U.S. Provisional Patent Application Ser. No. 62/658,263, filed Apr. 16, 2018, [reference number AB0649-Z], and to U.S. Provisional Patent Application Ser. No. 62/671,798, filed May 15, 2018, [reference number A131596-Z], and to U.S. Provisional Patent Application Ser. No. 62/687,705, filed Jun. 20, 2018, [reference number AB2748-Z], and to U.S. Provisional Patent Application Ser. No. 62/765,197, filed Aug. 20, 2018, [reference number A134448-Z], all of which are incorporated by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to MulteFire narrowband-internet-of-things (MF NB-IoT) operation. Some embodiments relate to synchronization signals.

BACKGROUND

Base stations and mobile devices may exchange data in unlicensed spectrum. As demand for mobile services and high data rates increases, various challenges related to reliability and capacity may arise. In an example scenario, a large number of users may communicate in the unlicensed spectrum, which may affect performance in terms of interference, range, capacity, throughput and/or other aspects. In another example scenario, a target latency for a user and/or application may be relatively low, and it may be challenging for the system to deliver in an efficient manner. Accordingly, there is a general need for methods and systems to implement communication between the base station and the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
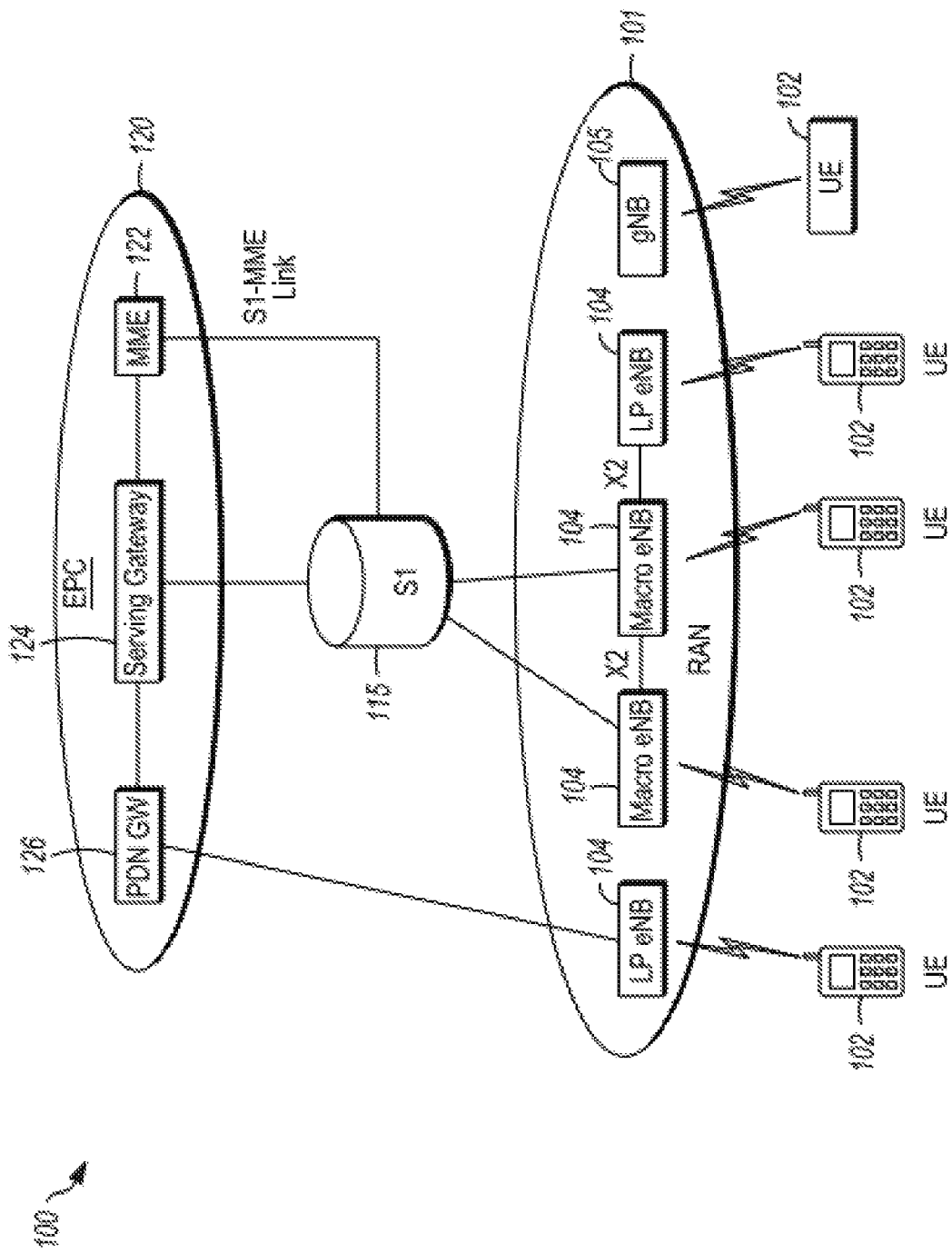
FIG. 1A is a functional diagram of an example network in accordance with some embodiments.
Figure 1B:
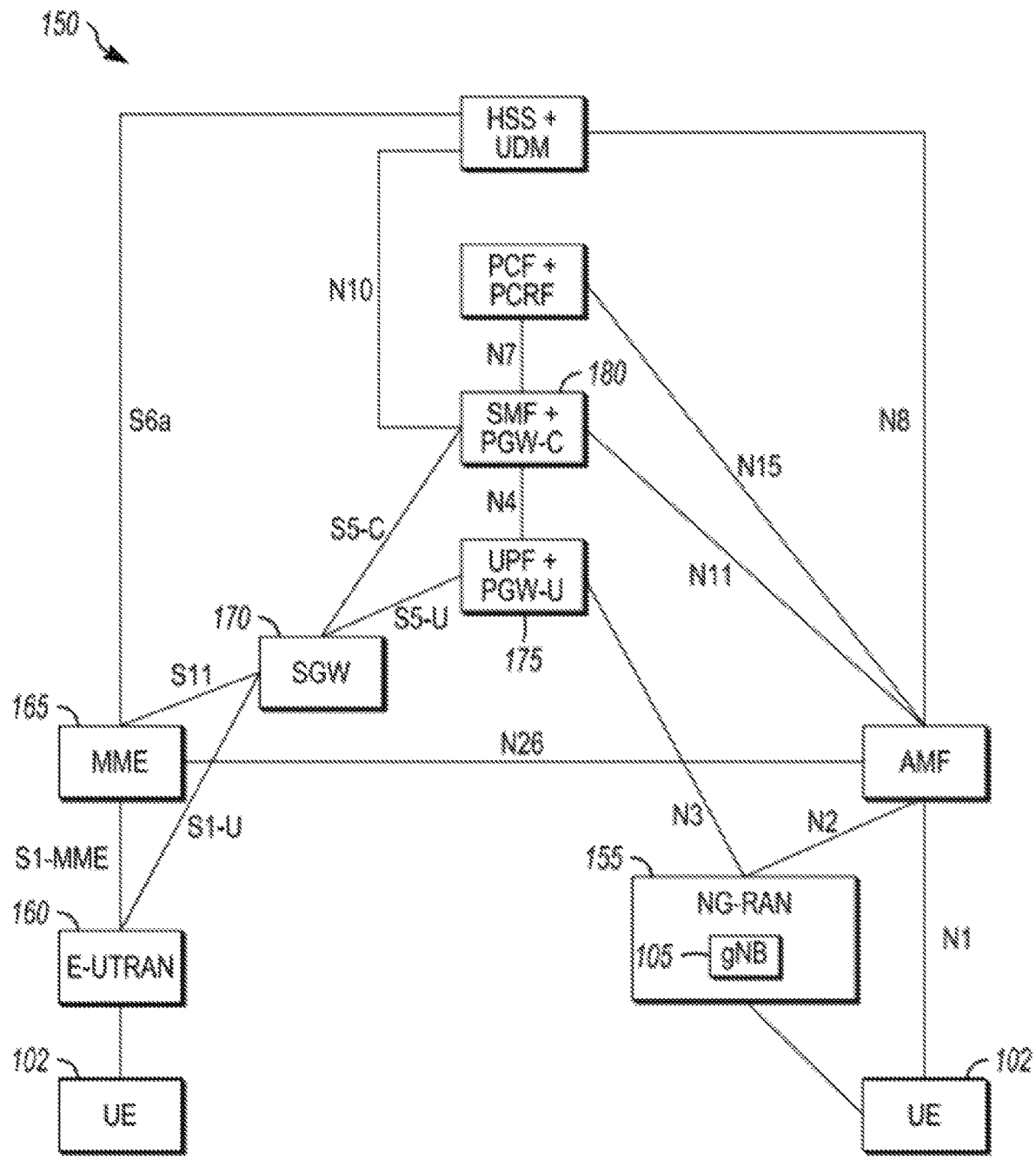
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a MulteFire network may be used in some cases. As another example, a MulteFire narrowband internet-of-things (MF NB IoT) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a. network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the UE 102 may be an MF NB-IoT UE 102 In some embodiments, the UE 102 may be configured to operate as an MF NB-IoT UE 102. In some embodiments, the UE 102 may perform one or more operations that are performed (in descriptions herein) by an MF NB-IoT UE 102. References to a UE 102 or to an MF NB-IoT UE 102 are not limiting. In an example, a technique, operation and/or method performed by a UE 102 in descriptions herein may be performed by an MF NB-IoT UE 102, in some embodiments. In another example, a technique, operation and/or method performed by an ME NB-IoT UE 102 in descriptions herein may be performed by a UE 102, a UE 102 configured to operate as an ME NB-IoT UE 102 or by another device, in some embodiments. In another example, a concept, technique, operation and/or method may be described herein in terms of one of a UE 102 or an MF NB-IoT UE 102. The same (and/or similar) concept, technique, operation and/or method may be applicable to the other device (UE 102 or an MF NB-IoT UE 102), in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a MulteFire protocol and/or MulteFire standard, although the scope of embodiments is not limited in this respect. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, MF NB-IoT UEs 102, gNBs 105, and/or eNBs 104 may be configured to operate in accordance with a MulteFire protocol and/or MulteFire techniques. References to a UE 102, MF IoT UEs 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the MF UI s 102 may transmit signals (data, control and/or other) to the gNB 105, and may receive signals (data, control and/or other) from the gNB 105. In some embodiments, the MF NB-IoT UEs 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, MF NB-IoT UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a MF NB-IoT UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U.

The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the SI interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126, Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MMF 165 may perform one or more operations or functionality similar to those described herein regarding the MIME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGM 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an QNB 104 to an MF NB-IoT UE 102, while uplink transmission from the MF NB-MT UE 102 to the eNB 104 may utilize similar techniques. In some embodiments, a downlink resource grid may be used for downlink transmissions from a gNB 105 to a MF NB-IoT UE 102, while uplink transmission from the MF NB-IoT UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
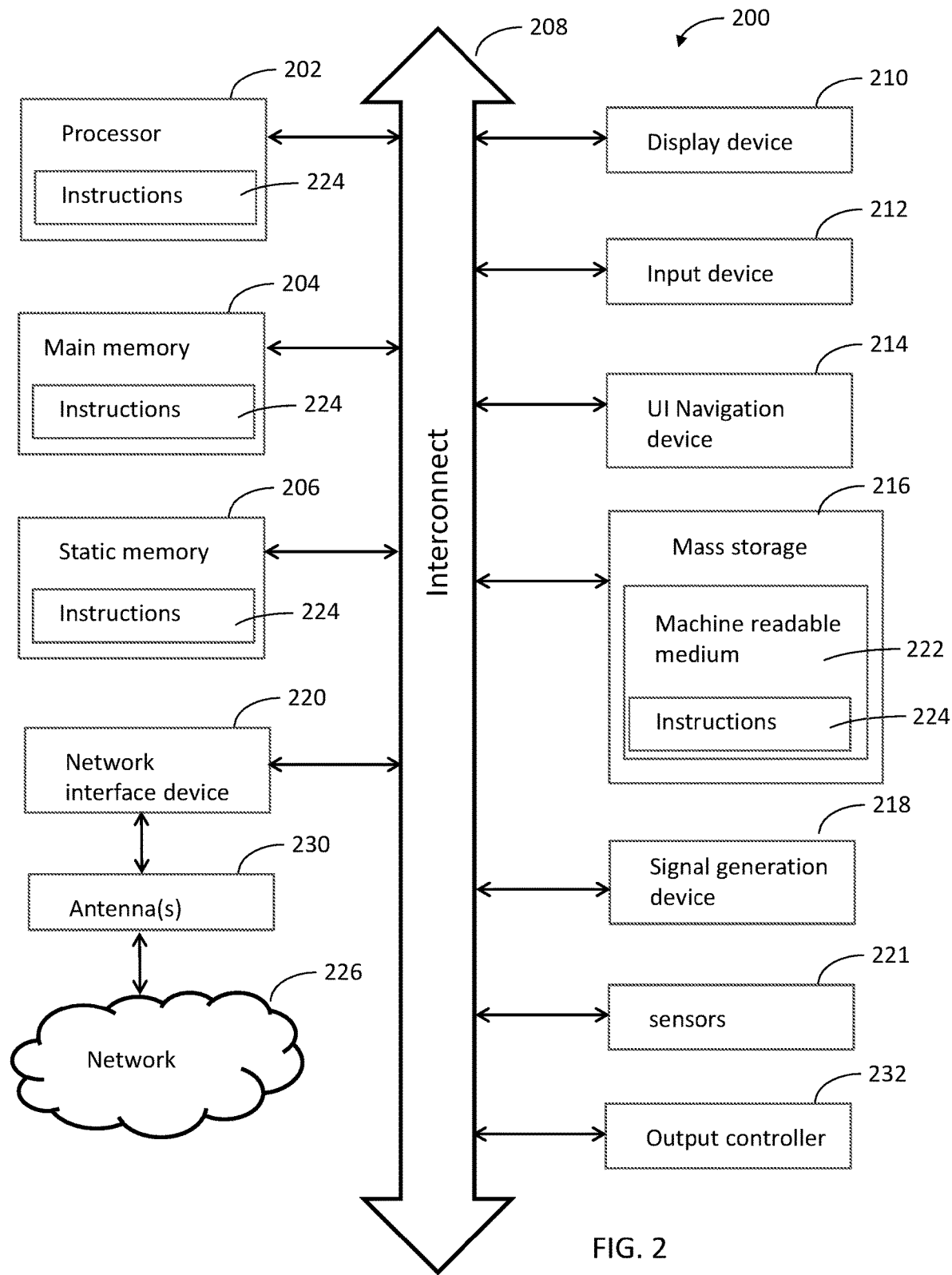
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines, in a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, MF NB-IoT UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In sonic embodiments, the machine readable medium may be or may include a computer readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a. Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
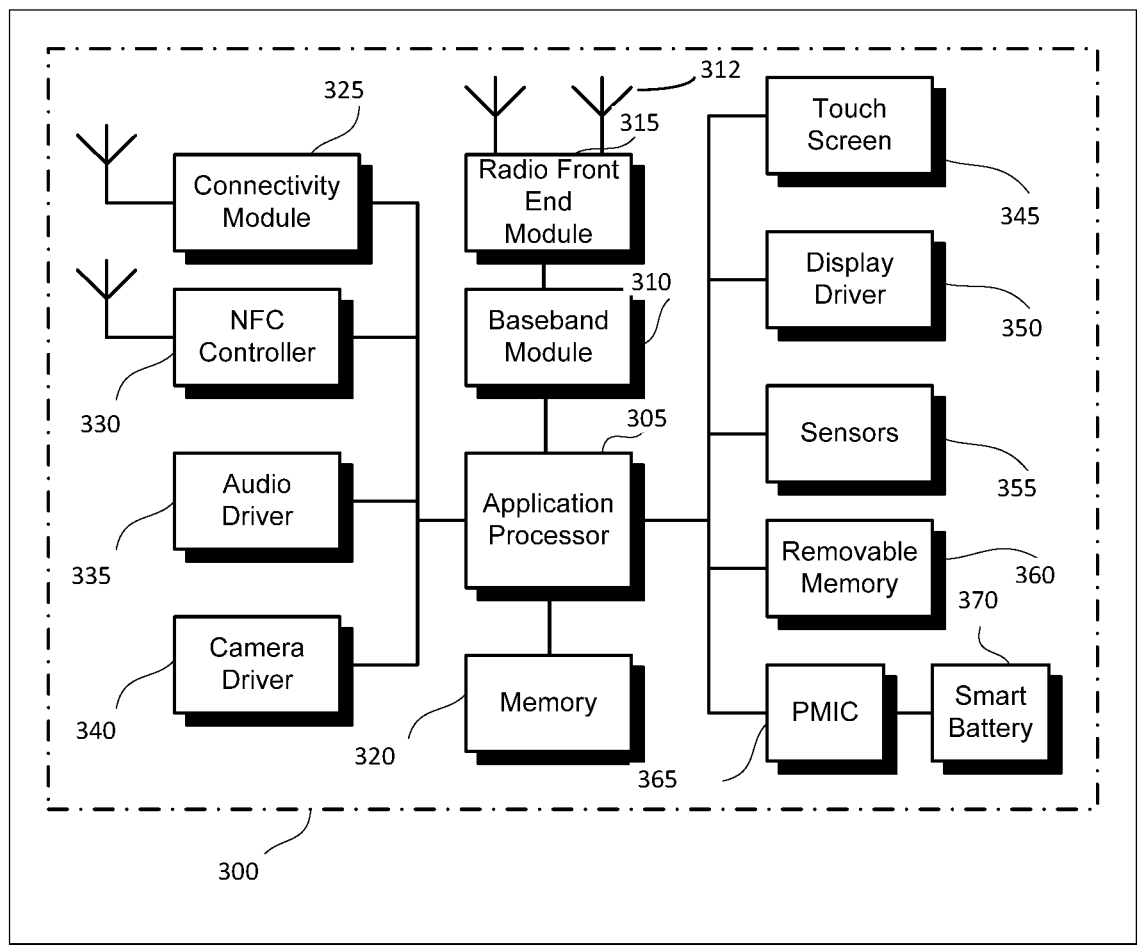
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be or may be configured to operate as an MF NB-IoT UE 102. In some embodiments, the user device 300 may be arranged to operate in accordance with a MulteFire protocol. In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as an MF NB-IoT UE 102 or as a UE 102 as depicted in FIG. 1, in some embodiments. It should be noted that in some embodiments, a UE, an apparatus of a UE, an MF NB-IoT UE, an apparatus of an MF NB-IoT UE, a user device or an apparatus of a user device may include one or more of the components shown in one or more of FIGS. 2, 3, and 5. In some embodiments, such a UE, MF NB-IoT UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. in some aspects, the user device 300 may be a MF NB-IoT UE.

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
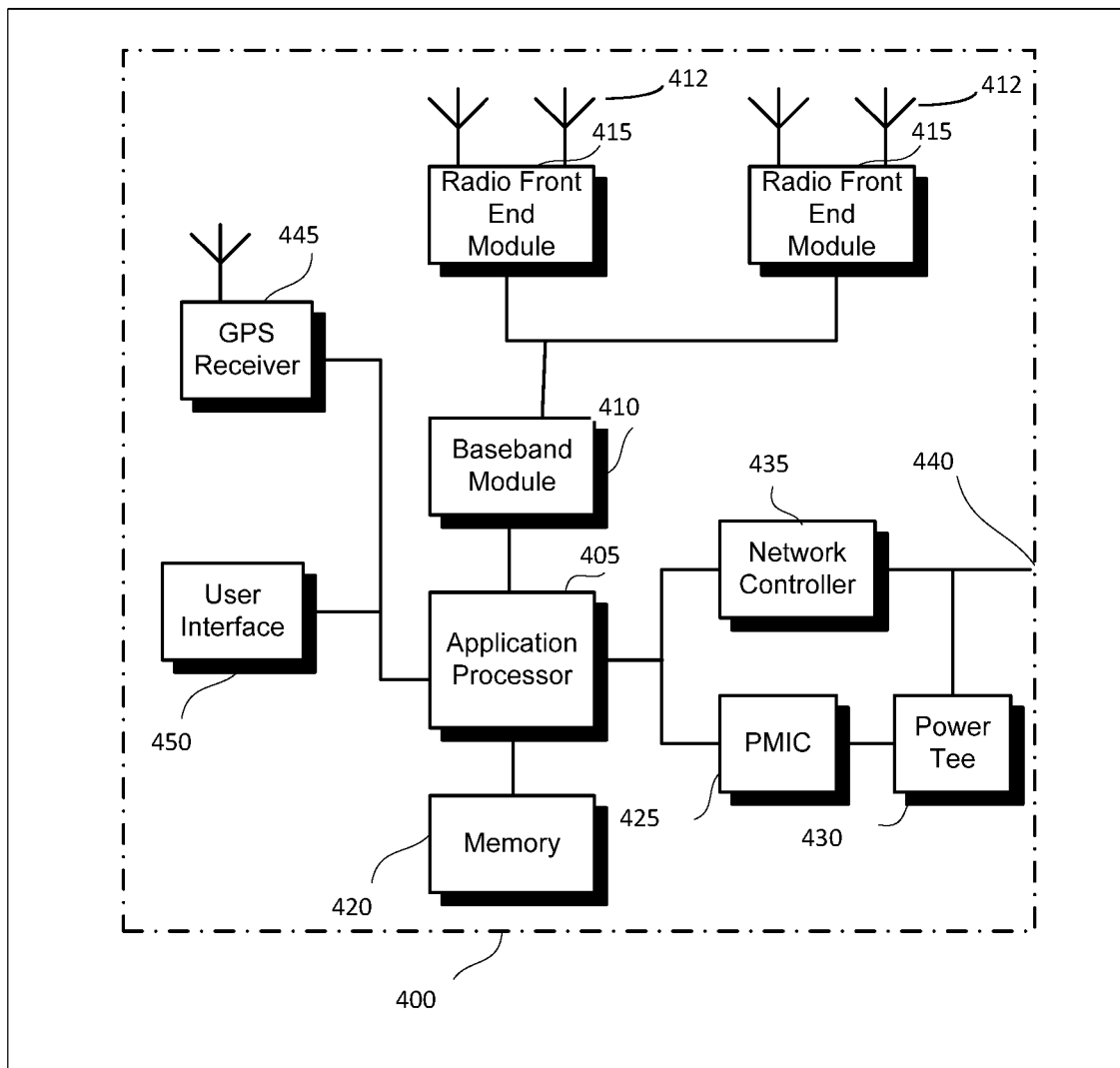
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a MulteFire protocol. In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol, MulteFire protocol and/or Fifth Generation (5G) protocol. In some aspects, the base station 400 may be a Next Generation Node-B (gNB), which may be arranged to operate in accordance with a 3GPP protocol, NR protocol, MulteFire protocol and/or 5G protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
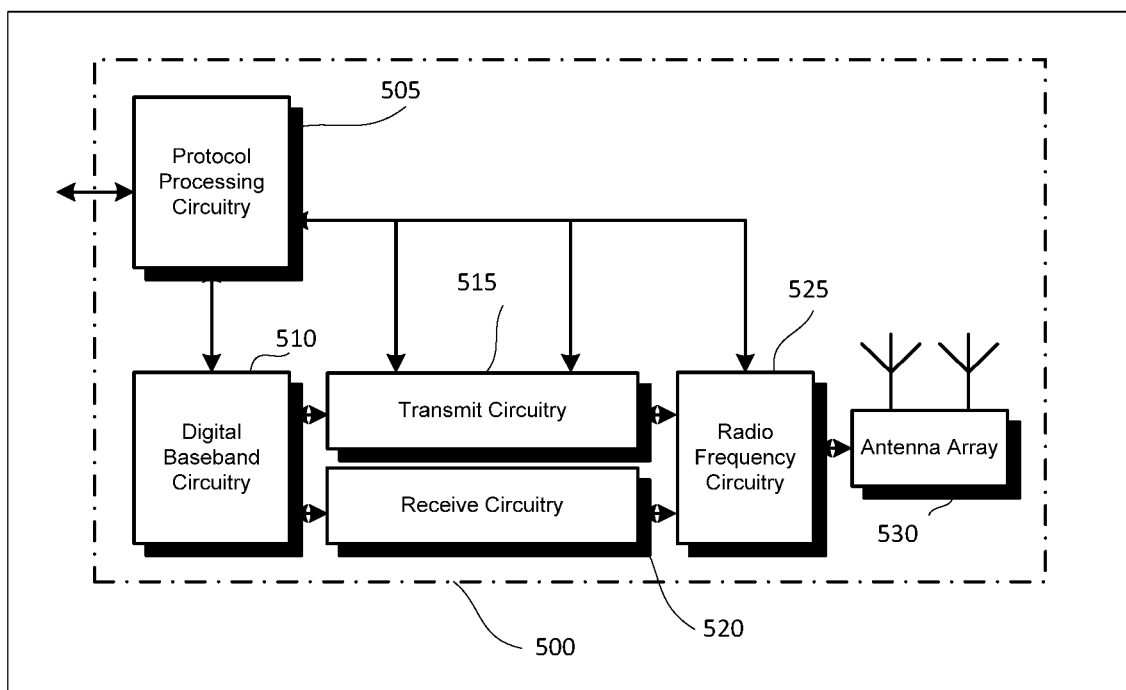
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, MF NB-IoT LTE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PRY) functions including one or more of hybrid automatic repeat request (HARQ) functions, scrambling and/or descrambling, coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MEMO) embodiments, one or more of the antennas (such as 230, 312, 412, 530 and/or others) may be effectively separated to take advantage of spatial diversity and the different channel characteristics that may result.

In some embodiments, the UE 102, MF NB-IoT UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, MF NB-IoT UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, MF NB-IoT UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, MF NB-IoT UE 102, eNB 104, gNB 105, user device 300, base station 400, machine 200 and/or other device described herein may be configured to operate according to other protocols or standards, including IEEE 802.11 or other IEEE standards. In some embodiments, the UE 102, MF NB-IoT UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, MF NB-IoT UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the FIE 102, MF NB-IoT UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE, In addition, techniques and operations described herein that refer to the ME NB-IoT UE 102 may be applicable to an apparatus of an MF NB-IoT UE 102. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
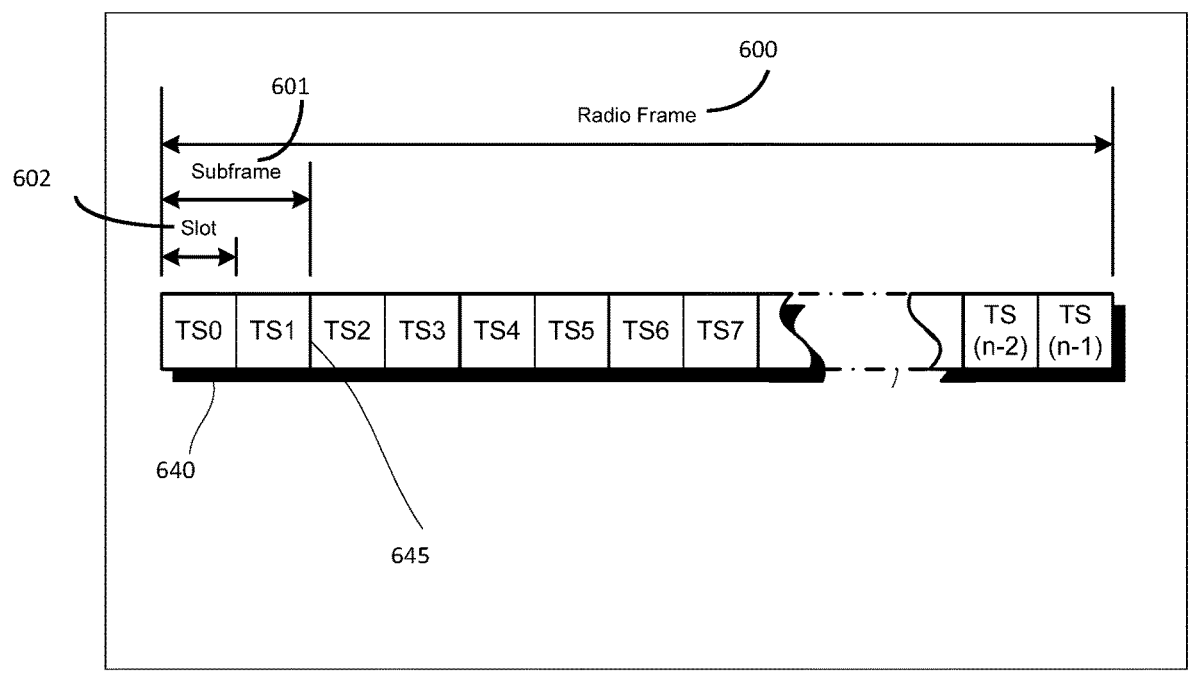
FIG. 6 illustrates an example of a radio frame structure in accordance with some embodiments.
Figures 7A, 7B:
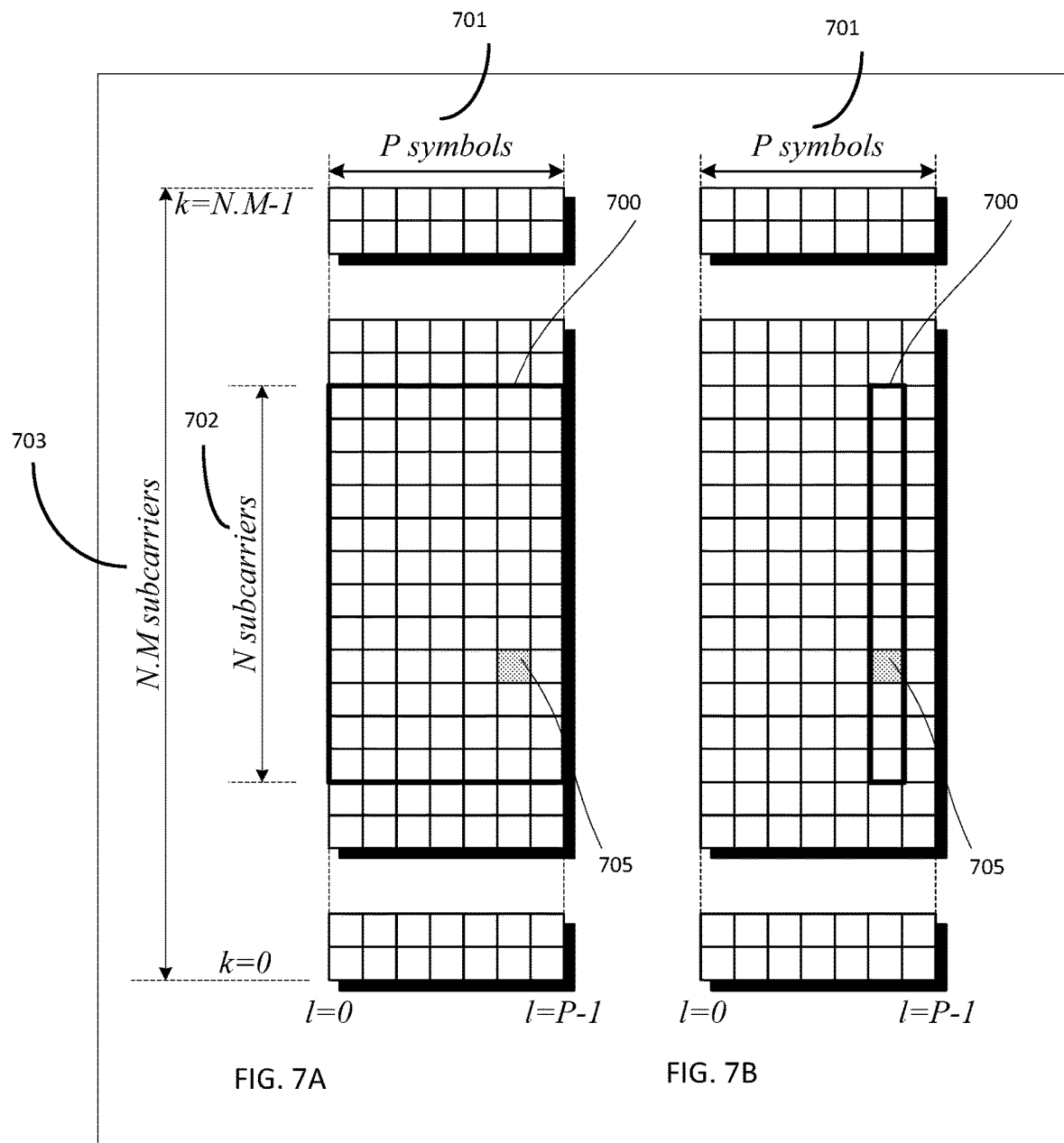
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, OFDM symbols, frequency resources, REs, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval (OFDM symbol) in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, the eNB 104 may encode an unlicensed narrowband primary synchronization signal (U-NPSS) for transmission in a plurality of subframes of 14 orthogonal frequency division multiplexing (OFDM) symbols each, the U-NPSS for time synchronization of MF NB-IoT UEs 102. The eNB 104 may, for the U-NPSS, for each subframe of the plurality of subframes, and for each of the 14 OFDM symbols of the subframe: repeat a sequence of length-11; and map the sequence to 11 resource elements (REs) of a physical resource block (MB) of 12 REs. The eNB 104 may process the U-NPSS by an orthogonal cover code (OCC) over the plurality of subframes. The OCC may be of length equal to a product of 14 and a number of subframes in the plurality of subframes. The sequence in each of the 14 OFDM symbols of each of the subframes of the plurality of subframes may be multiplied by a different element of the OCC. These embodiments are described in more detail below.

Figure 8:
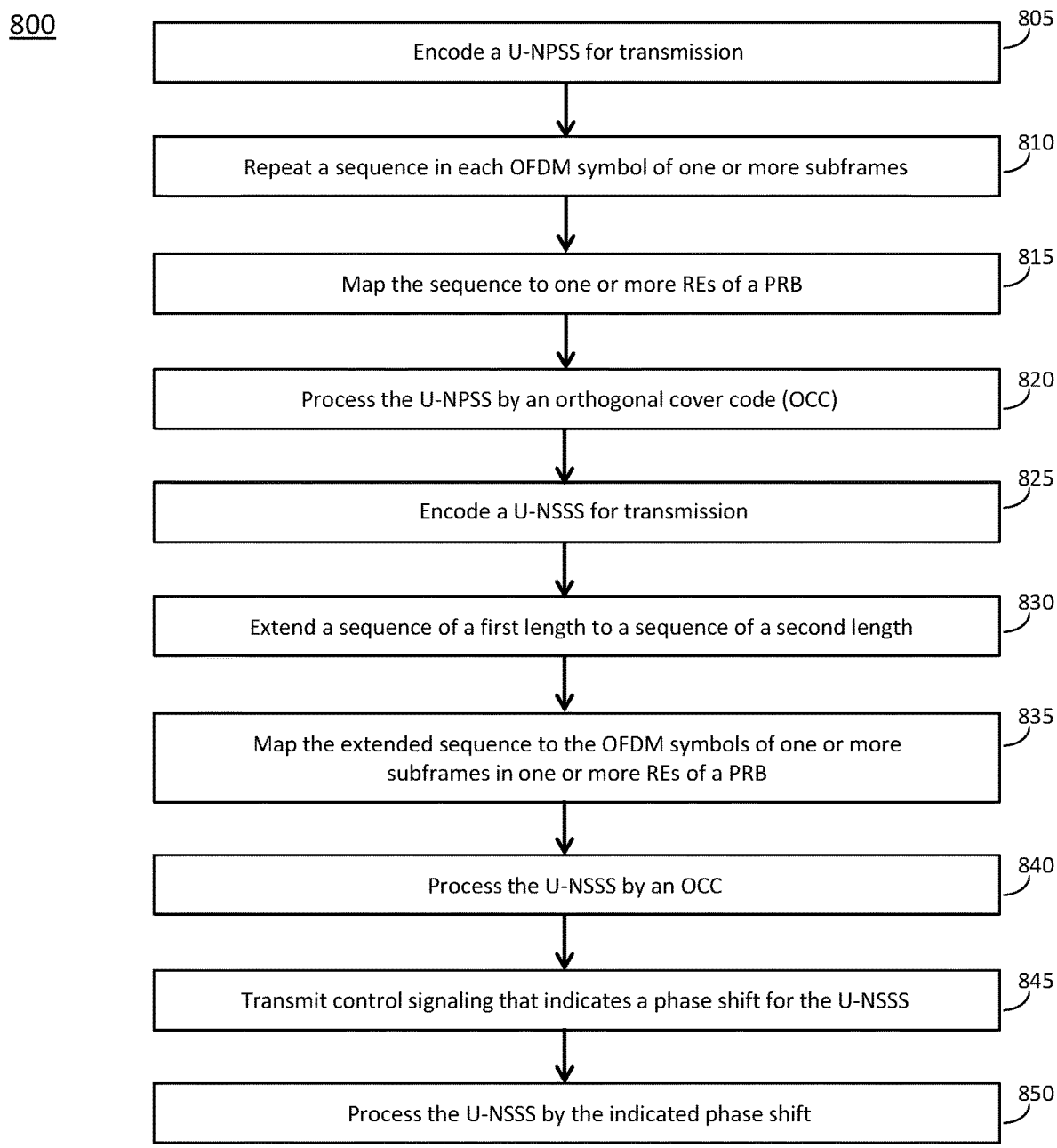
FIG. 8 illustrates the operation of a method of communication in accordance with some embodiments.
Figure 9:
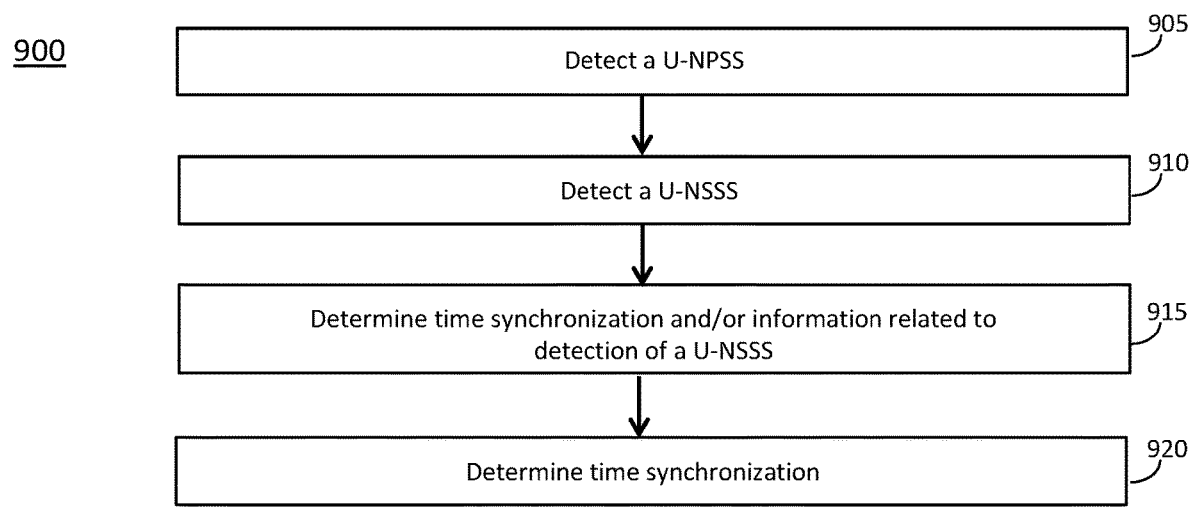
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an eNB 104 may perform one or more operations of the method 800, but embodiments are not limited to performance of the method 800 and/or operations of it by the eNB 104. In some embodiments, another device and/or component may perform one or more operations of the method 800. In some embodiments, another device and/or component may perform one or more operations that may be similar to one or more operations of the method 800. In sonic embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments. In another non-limiting example, the UE 102 may perform an operation that may be the same as, similar to, reciprocal to and/or related to an operation of the method 800, in some embodiments.

In some embodiments, an MF NB-IoT 102 may perform one or more operations of the method 900, but embodiments are not limited to performance of the method 900 and/or operations of it by the MF NB-IoT UE 102. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the eNB 104 may perform an operation that may be the same as, similar to, reciprocal to and/or related to an operation of the method 800, in some embodiments. In another non-limiting example, the gNB 105 may perform an operation that may be the same as, similar to, reciprocal to and/or related to an operation of the method 800, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message, signal and/or other) by the eNB 104, and an operation of the method 900 may include reception of a same element (and/or similar element) by the MF NB-IoT UE 102.

In descriptions of the techniques, operations, methods and/or concepts herein, references to a MulteFire narrow-band internet-of-things User Equipment (ME NB-IoT UE) 102 are not limiting. One or more of the techniques, operations, methods and/or concepts may be applicable to other devices, including but not limited to a UE 102, an NB-IoT UE, a UE 102 configured to operate in accordance with MulteFire NB-IoT techniques and/or other device. For instance, another device (such as a UE 102, an NB-IoT UE, a UE 102 configured to operate in accordance with Multe-Fire NB-IoT techniques and/or other device) may perform one or more of those techniques, operations and/or methods, in some embodiments.

Discussion of various techniques and concepts regarding one of the methods 800, 900 and/or other method may be applicable to one of the other methods, although the scope of embodiments is not limited in this respect. Such technique and concepts may include U-NPSS, U-NSSS, MulteFire, operation in unlicensed spectrum and/or other. In some cases, descriptions of operations and techniques described as part of one of the methods 800, 900 may be relevant to the other method.

The methods 800, 900 and other methods described herein may refer to eNBs 104, gNBs 105, MF NB-IoT UEs 102 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an ME NB-IoT UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR), MulteFire and/or other. The scope of embodiments is not limited to usage of elements that are included in standards, however.

In some embodiments, the eNB 104 may be arranged to operate in accordance with a MulteFire technique in unlicensed spectrum without usage of an anchor carrier, although the scope of embodiments is not limited in this respect. In some embodiments, the MF NB-IoT UE 102 may be arranged to operate in accordance with a MulteFire technique in unlicensed spectrum without usage of an anchor carrier, although the scope of embodiments is not limited in this respect.

At operation 805, the eNB 104 may encode an unlicensed narrowband primary synchronization signal (U-NPSS) for transmission. At operation 810, the eNB 104 may repeat a sequence in each OFDM symbol of one or more subframes. At operation 815, the eNB 104 may map the sequence to one or more resources elements (REs) of a physical resource block (PRB). At operation 820, the eNB 104 may process the U-NPSS by an orthogonal cover code (OCC).

In some embodiments, the eNB 104 may encode a U-NPSS for transmission in a plurality of subframes of 14 orthogonal frequency division multiplexing (OFDM) symbols each, The U-NPSS may be for time synchronization of MF NB-IoT UEs 102, although the scope of embodiments is not limited in this respect. In some embodiments, the eNB 104 may, for the U-NPSS, for each subframe of the plurality of subframes, and for each of the 14 OFDM symbols of the subframe: repeat a sequence of length-11; and map the sequence to 11 resource elements (REs) of a physical resource block (PRB) of 12 REs. In some embodiments, the eNB 104 may, for the U-NPSS, for each subframe of the plurality of subframes, and for all of the 14 OFDM symbols of the subframe: repeat a sequence of length-11; and map the sequence to 11 REs of a PRB of 12 REs. In some embodiments, the eNB 104 may process the U-NPSS by an orthogonal cover code (OCC) over the plurality of subframes. The OCC may be of length equal to a product of 14 and a number of subframes in the plurality of subframes. The sequence in each of the 14 OFDM symbols of each of the subframes of the plurality of subframes may be multiplied by a different element of the OCC.

Embodiments are not limited to the numbers given above. In some embodiments, the eNB 104 may encode a U-NPSS for transmission in a plurality of subframes of any suitable number of OFDM symbols each. The U-NPSS may be for time synchronization of MF NB-IoT UEs 102, although the scope of embodiments is not limited in this respect. In some embodiments, the eNB 104 may, for the U-NPSS, for each subframe of the plurality of subframes, and for each of the OFDM symbols of the subframe: repeat a sequence of any suitable length; and map the sequence to one or more REs of a PRB (which may include any suitable number of REs). In some embodiments, the eNB 104 may, for the U-NPSS, for each subframe of the plurality of subframes, and for all of the OHM symbols of the subframe: repeat a sequence of any suitable length; and map the sequence to one or more REs of a PRB (which may include any suitable number of REs). In some embodiments, the eNB 104 may process the U-NPSS by an orthogonal cover code (OCC) over the plurality of subframes. The OCC may be of length equal to a product of a number of OFDM symbols per subframe and a number of subframes in the plurality of subframes. The sequence in each of the OFDM symbols of each of the subframes of the plurality of subframes may be multiplied by a different element of the OCC.

In some embodiments, the eNB 104 may encode the U-NPSS for transmission on a same antenna port during each subframe of the plurality of subframes. In some embodiments, the eNB 104 may encode the U-NPSS for transmission that is restricted to usage of the same antenna port in no more than 4 consecutive subframes. Embodiments are not limited to usage of 4 consecutive subframes, however. In some embodiments, the eNB 104 may encode the U-NPSS for transmission that is restricted to usage of the same antenna port in no more than "X" consecutive subframes, wherein X may be any suitable number (including but not limited to 4).

In some embodiments, the sequence on which the U-NPSS is based may be a Zadoff-Chu (ZC) sequence. The U-NPSS may be based on any suitable sequence(s), however.

At operation 825, the eNB 104 may encode an unlicensed narrowband secondary synchronization signal (U-NSSS) for transmission. At operation 830, the eNB 104 may extend a sequence of a first length to a sequence of a second length. At operation 835, the eNB 104 may map the extended sequence to the OFDM symbols of one or more subframes in one or more REs of a PRB. At operation 840, the eNB 104 may process the U-NSSS by an OCC. At operation 845, the eNB 104 may transmit control signaling that indicates a phase shift for the U-NSSS. At operation 850, the eNB 104 may process the U-NSSS by the indicated phase shift.

In some embodiments, the eNB 104 may encode the U-NPSS for transmission in a first plurality of subframes. The U-NPSS may be encoded based on a first sequence. The eNB 104 may encode, for transmission in a second plurality of subframes of 14 OFDM symbols each and further for transmission in the PRB, a U-NSSS. In some embodiments, the eNB 104 may, for the U-NSSS, for each subframe of the second plurality of subframes: encode a second sequence of length-167 extended to a sequence of length-168; and map the extended second sequence to the 14 OFDM symbols of the subframe in the 12 REs of the PRB. In some embodiments, the eNB 104 may, for the U-NSSS, for each subframe of the second plurality of subframes: encode a second sequence of length-167 extended to a sequence of length-168; and map the extended second sequence to all of the 14 OFDM symbols of the subframe in the 12 REs of the PRB.

Embodiments are not limited to the sizes given above, however. In some embodiments, the subframes of the second plurality of subframes may include any suitable number of subframes (including but not limited to 14); the second sequence may be of any suitable length and may be extended to any suitable length; and the extended sequence may be mapped to the OFDM symbols of the subframe in any suitable number of REs of the PRB. In some embodiments, the subframes of the second plurality of subframes may include any suitable number of subframes (including but not limited to 14); the second sequence may be of any suitable length and may be extended to any suitable length; and the extended sequence may be mapped to all of the OFDM symbols of the subframe in any suitable number of REs of the PRB.

In addition, embodiments are not limited to encoding of the U-NPSS for transmission in a plurality of subframes. In some embodiments, the eNB 104 may encode the U-NPSS for transmission in one or more subframes. In descriptions herein, one or more concepts, techniques, operations and/or methods may refer to encoding of the U-NPSS for transmission in a plurality of subframes, but it is understood that one or more of those concepts, techniques, operations and/or methods may be applicable to embodiments in which the U-NPSS is encoded for transmission in one or more subframes. In addition, embodiments are not limited to encoding the U-NSSS for transmission in a plurality of subframes. In some embodiments, the eNB 104 may encode the U-NSSS for transmission in one or more subframes. In descriptions herein, one or more concepts, techniques, operations and/or methods may refer to encoding of the U-NSSS for transmission in a plurality of subframes, but it is understood that one or more of those concepts, techniques, operations and/or methods may be applicable to embodiments in which the U-NSSS is encoded for transmission in one or more subframes.

In some embodiments, the second sequence may be a Zadoff-Chu (ZC) sequence, although the scope of embodiments is not limited in this respect. In some embodiments, a root of the Zadoff-Chu sequence may be equal to a sum of: a cell ID taken modulo 126, and the number 3. Embodiments are not limited to these example numbers, as the root may be based on any suitable numbers.

In some embodiments, a size of the first plurality of subframes may be 8 subframes, a size of the second plurality of subframes may be 2 subframes. A non-limiting example of such an arrangement is shown as 1120 in FIG. 11. Embodiments are not limited to these example numbers, as the first and second pluralities of subframes may include any suitable numbers of subframes. In some embodiments, the first plurality of subframes may precede the second plurality of subframes. The scope of embodiments is not limited in this respect, however, as other patterns of subframes for the U-NPSS and the U-NSSS may be used, in some embodiments.

In some embodiments, the first plurality of subframes and the second plurality of subframes may be contained within a third, larger plurality of subframes. The third plurality of subframes may include one or more subframes that are not used for U-NPSS or U-NSSS. For instance, the first, second, and third pluralities of subframes may include 8, 2, and 40 subframes, respectively, and 30 of the subframes of the third plurality are not used for U-NPSS or U-NSSS.

In some embodiments, the first plurality of subframes (used for the U-NPSS) may include consecutive subframes, non-consecutive subframes or a combination thereof. In some embodiments, the second plurality of subframes (used for the U-NSSS) may include consecutive subframes, non-consecutive subframes or a combination thereof.

In some embodiments, the eNB 104 may process the U-NPSS by a first OCC, and may process the U-NSSS by a second OCC. In a non-limiting example, the second OCC may be based on a Hadamard code of length-160 extended to a sequence of length-168. Embodiments are not limited to usage of Hadamard codes, or to the sizes given above. In a non-limiting example, the second OCC may be based on a second sequence of any suitable size. In another non-limiting example, the second OCC may be based on a second sequence of any suitable size that may be extended to any suitable size.

In some embodiments, the eNB 104 may process the U-NSSS by a phase shift proportional to a configurable field of two bits. In some embodiments, the eNB 104 may encode, for transmission, control signaling that indicates the configurable field. Any suitable type of control signaling may be used, including but not limited to control signaling included in a 3GPP standard, LTE standard and/or other standard. In a non-limiting example, RRC signaling may be used. In some embodiments, the two bits may be related to one or more of a paging indication, access baring and/or other. Embodiments are not limited to usage of two bits, as any suitable number of bits (such as 1, or 2) may be used.

In some embodiments, the eNB 104 may encode the U-NSSS for transmission on a same antenna port during each subframe of the second plurality of subframes. In some embodiments, the eNB 104 may encode the U-NSSS for transmission restricted to usage of different antenna ports in two consecutive subframes.

In some embodiments, a size of the first plurality of subframes (the plurality of subframes in which the U-NPSS is encoded for transmission) may be 8 subframes. In some embodiments, a size of the second plurality of subframes (the plurality of subframes in which the U-NSSS is encoded for transmission) may be 2 subframes. Embodiments are not limited to these example numbers, however, as any suitable number of subframes may be included in the first and second pluralities of subframes.

In some embodiments, the PRB may be allocated at least partly for transmission of the U-NPSS. In some embodiments, the PRB may be included in a plurality of PRBs, at least some of which are not allocated for the transmission of the U-NPSS.

In a non-limiting example, the eNB 104 may encode, for transmission, a U-NPSS that spans a first plurality of subframes of 14 OFDM symbols each. The eNB 104 may encode, for transmission in each subframe of the first plurality of subframes, the U-NPSS based on a sequence of length-11 repeated in each of the 14 OFDM symbols of the subframe. The eNB 104 may encode, for transmission, a U-NSSS that spans a second plurality of subframes of 14 OFDM symbols each. The eNB 104 may encode the U-NSSS for transmission in each subframe of the second plurality of subframes based on a second sequence (which may be a ZC sequence and/or other sequence) of length-167 extended to a sequence of length-168. The eNB 104 may map the extended second sequence to the 14 OFDM symbols of the subframe. Embodiments are not limited to the sizes given above.

In some embodiments, the eNB 104 may process the U-NPSS by an OCC over the first plurality of subframes. The OCC may be of length equal to a product of 14 and a number of subframes in the first plurality of subframes. The sequence in each of the 14 OFDM symbols of each of the subframes of the first plurality of subframes may be multiplied by a different element of the OCC.

In some embodiments, an apparatus of an eNB 104 may comprise memory. The memory may be configurable to store at least a portion of the U-NPSS. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding the U-NPSS. The apparatus may include a transceiver to transmit the U-NPSS. The transceiver may transmit and/or receive other blocks, messages and/or other elements.

At operation 905, the MF NB-IoT UE 102 may detect a U-NPSS. At operation 910, the MF NB-IoT UE 102 may detect a U-NSSS. At operation 915, the MF NB-IoT UE 102 may determine time synchronization and/or information related to detection of a U-NSSS. At operation 920, the MF NB-IoT UE 10 may determine time synchronization.

In some embodiments, the MF NB-IoT UE 102 may determine, based at least partly on the U-NPSS and/or detection of the U-NPSS, information related to one or more of: time synchronization, frequency synchronization, detection of a U-NSSS, one or more subframes for the detection of the U-NSSS, and/or other. In some embodiments, the MF NB-IoT UE 102 may determine, based at least partly on the U-NPSS and/or detection of the U-NSSS, information related to one or more of time synchronization, frequency synchronization, and/or other.

In some embodiments, the MF NB-IoT UE 102 may detect a U-NPSS that spans a first plurality of subframes of 14 OFDM symbols each. In each subframe of the first plurality of subframes, the U-NPSS may be based on a sequence of length-11 repeated in each of the 14 OFDM symbols of the subframe. In some embodiments, the MF NB-IoT UE 102 may determine, based on detection of the U-NPSS, a second plurality of subframes to monitor for a U-NSSS. The MF NB-IoT UE 102 may detect the U-NSSS. The U-NSSS may span a second plurality of subframes of 14 OFDM symbols each. In each subframe of the second plurality of subframes, the U-NSSS may be based on a second sequence of length-167 extended to a sequence of length-168. The extended second sequence may be mapped to the 14 OFDM symbols of the subframe in the 12 REs of the PRB. The MF NB-IoT UE 102 may determine a timing synchronization based on detection of the U-NSSS. In a non-limiting example, a size of the first plurality of subframes may be 8 and a size of the second plurality of subframes may be 2. In some embodiments, the MF NB-IoT UE 102 may detect the U-NPSS in accordance with an OCC of length equal to a product of 14 and the size of the first plurality of subframes. Embodiments are not limited to the sizes/numbers given above, as any suitable sizes/numbers may be used.

In some embodiments, the MF NB-IoT UE 102 may detect the U-NPSS based on: a same antenna port for the U-NPSS within a subframe of the first plurality of subframes, and a restriction that the same antenna port is used in no more than 4 consecutive subframes. In some embodiments, the MF NB-IoT UE 102 may detect the U-NSSS based on: a same antenna port for the U-NSSS within a subframe of the second plurality of subframes, and a restriction that different antenna ports are used in consecutive subframes.

In a non-limiting example, the first and second sequences may be Zadoff-Chu sequences. The scope of embodiments is not limited in this respect, however as any suitable sequences may be used.

In some embodiments, an apparatus of a MF NB-IoT LTE 102 may comprise memory. The memory may be configurable to store information related to the U-NPSS. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to detection of the U-NPSS. The apparatus may include a transceiver to receive the U-NPSS. The transceiver may transmit and/or receive other blocks, messages and/or other element.

Figure 10:
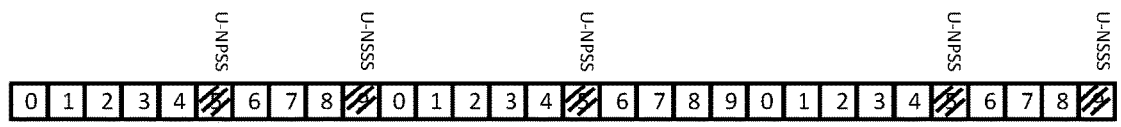
FIG. 10 illustrates an example arrangement of synchronization signals in accordance with some embodiments.
Figure 11:
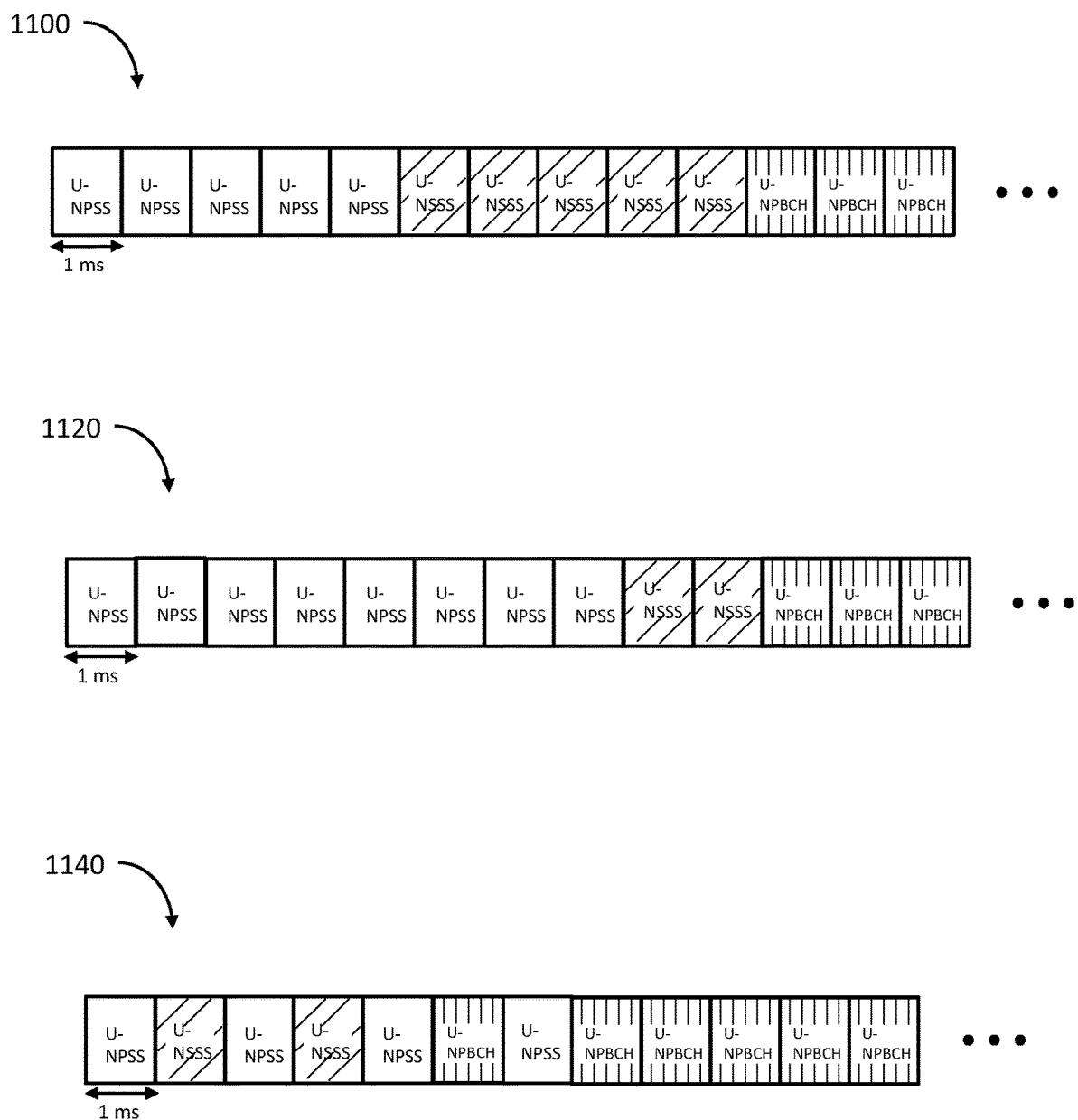
FIG. 11 illustrates another example arrangement of synchronization signals in accordance with some embodiments.
Figure 12:
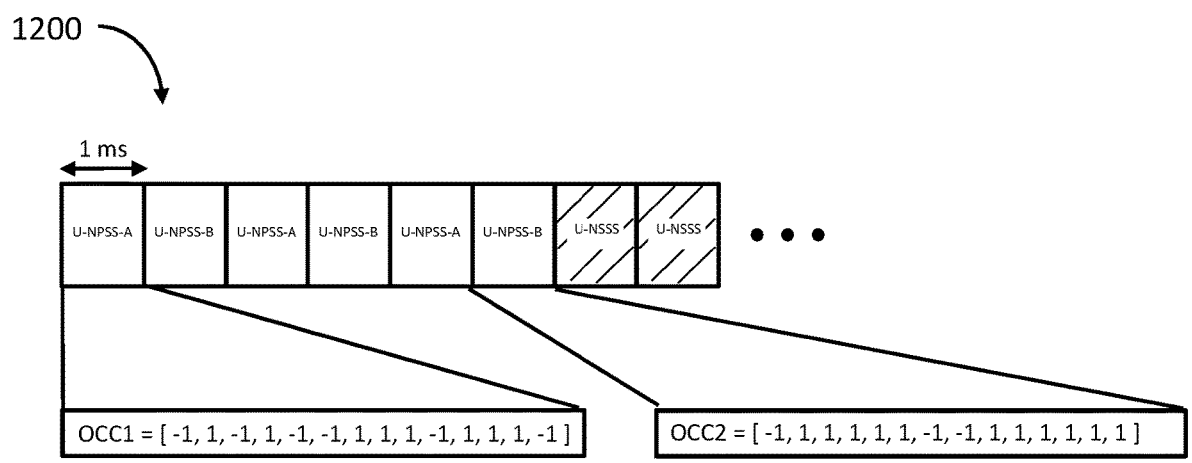
FIG. 12 illustrates another example arrangement of synchronization signals in accordance with some embodiments.
Figure 13:
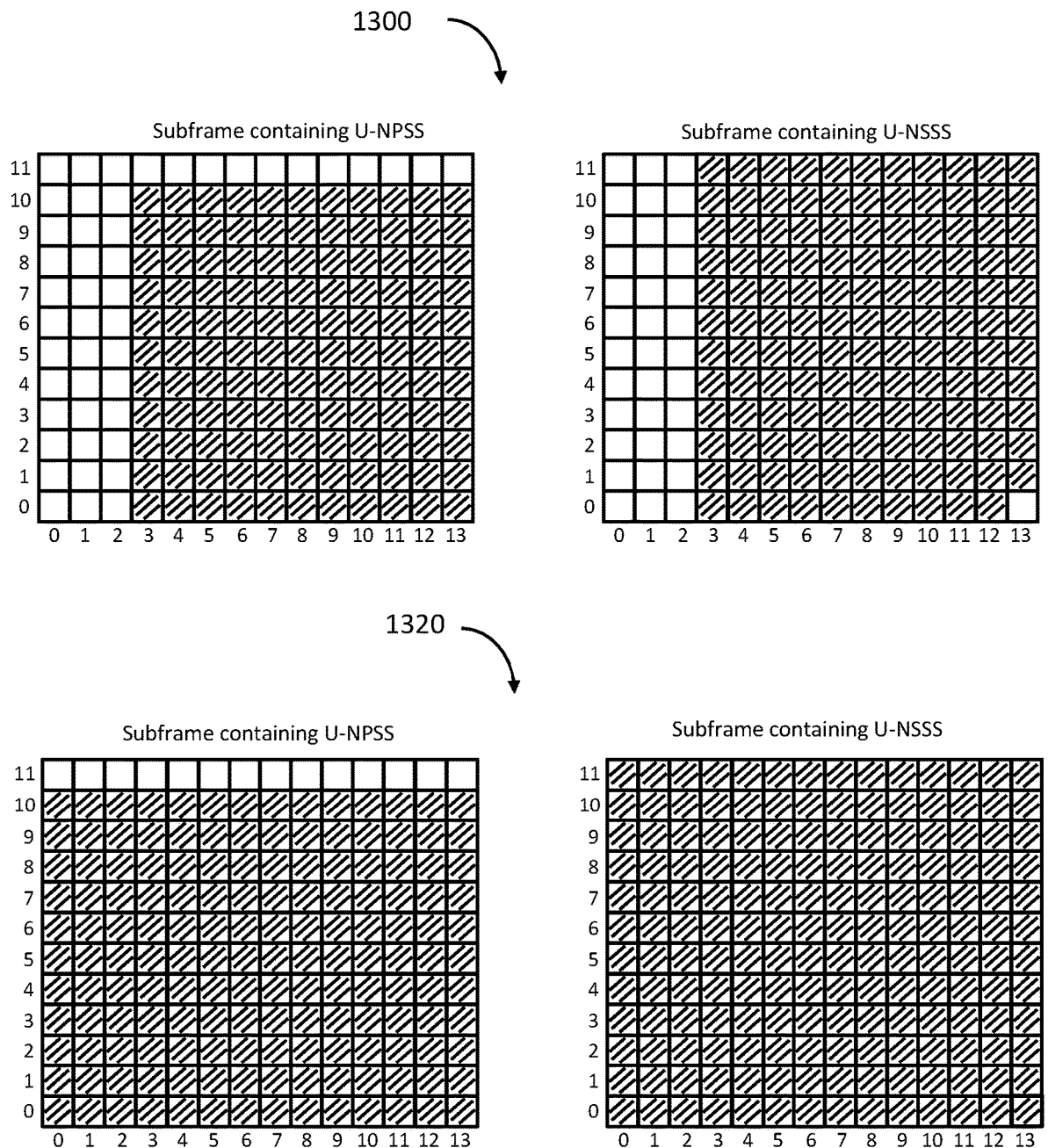
FIG. 13 illustrates an example arrangement of synchronization signals within each subframe, which may be applicable to one or more of FIGS. 10-12, in accordance with some embodiments.

FIG. 10 illustrates an example arrangement of synchronization signals in accordance with some embodiments. FIG. 11 illustrates another example arrangement of synchronization signals in accordance with some embodiments. FIG. 12 illustrates another example arrangement of synchronization signals in accordance with some embodiments. FIG. 13 illustrates an example arrangement of synchronization signals within each subframe, which may be applicable to one or more of FIGS. 10-12, in accordance with some embodiments.

It should be noted that the examples shown in FIGS. 10-13 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-13. Although some of the elements shown in the examples of FIGS. 10-13 may be included in a 3GPP LTE standard, 5G standard, NR standard and/or other standard, embodiments are not limited to usage of such elements that are included in standards.

In FIG. 10, an example 1000 illustrates a legacy arrangement, in which: U-NPSS is transmitted every 10 radio frames in SF #5, and U-NSSS is transmitted every 20 radio frames in SF #9.

In FIG. 13, two examples are provided. Example 1300 illustrates a legacy arrangement in which: U-NPSS is mapped to 11 REs of the 12 REs of a PRB in 11 OFDM symbols of the 14 OFDM symbols of a subframe; and U-NSSS is mapped to 12 REs of the 12 REs of a PRB in 11 OFDM symbols of the 14 OFDM symbols of a subframe (with the exception of one element in OFDM symbol #13 in RE #0).

Example 1320 illustrates an arrangement in accordance with some embodiments described herein, in which: a U-NPSS is mapped to 11 REs of the 12 REs of a PRB in 14 OFDM symbols of the 14 OFDM symbols of a subframe; and a U-NSSS is mapped to 12 REs of the 12 REs of a PRB in 14 OFDM symbols of the 14 OFDM symbols of a subframe.

In some embodiments, backward compatibility with previously designed systems may not be necessary, which may be considered as part of a design of U-NPSS, U-NSS and U-NPBCH. For instance, it may not be necessary to avoid usage of the first 3 OFDM symbols of a sub-frame. In some embodiments, all 14 OFDM symbols of a sub-frame may be used. In some embodiments, U-NPSS may be composed by a ZC sequence of length-11 with a fixed root (including but not limited to 5), and no shift. In some embodiments, U-NSSS may be a 167-length ZC in order to cover the all 14 OFDM symbols of a sub-frame. In some embodiments, the U-NSSS may be composed by a concatenation of the legacy NSSS which is a ZC of length-131, and a short ZC sequence of length-35. In some embodiments, the new short ZC sequence may not necessarily be used as an extension of the NSSS sequence for the first 3 OFDM symbols, but another sequence may be used. In some embodiments, a short ZC sequence of length-35 may be used in the first 3 OFDM symbols of a sub-frame to extend the legacy NSSS which extends over the later 11 OFDM symbols of a sub-frame.

In some embodiments, while in legacy NB-IoT, the NSSS sequence may carry information regarding the PCID, which may be indicated using a combination of base sequence, and length-128 Hadamard sequence, and the 80 ms boundary, throughout 4 time-domain cyclic shifts. It may not be necessary, in some embodiments, to have cyclic shifts for U-NSSS, as one of its uses in other embodiments is to notify the beginning of new blocks of U-NPBCH. In some embodiments, a cyclic shift may be applied to U-NSSS and used to carry barring information or provide paging indication. In some embodiments, a set of cyclic shifts to use may depend on the information bits. For instance, one bit information may be needed to carry either barring information or paging indication, which corresponds to 2 cyclic shifts, or two bits information may be needed to carry both barring information or paging indication, which corresponds to 4 cyclic shifts.

In some embodiments, multiple repetitions of U-NPSS, U-NSSS, and U-NPBCH may be used required. In some cases, in order to meet the target MCL set for NB-IoT-U, multiple repetitions of U-NPSS, U-NSSS, and U-NPBCH may be required.

In some embodiments, multiple repetitions of U-NSSS may follow multiple repetitions of U-NPSS. In some embodiments, each U-NPSS may be followed by a U-NSSS. In some embodiments, U-NPSS and U-NSSS may be followed by U-NPBCH. In some embodiments, a number of U-NPSS may be different than a number of U-NSSS. For instance, Z repetitions of U-NPSS may be used, and Y repetitions of U-NSSS may be used. Examples include, but are not limited to, one or more of the following: Z=1, and Y=1; Z=8, and Y=2; Z=17, and Y=3; Z>Y (this may mean that the performance of SS is tight with U-NPSS, in some cases, although the scope of embodiments is not limited in this respect); Z=12, and Y=4; Z=14, and Y=3; Z=16, and Y=4; Z=32, and Y=8.

Non-limiting examples 1100, 1120, and 1140 are shown in FIG. 11. It should be noted that the sub-frames labeled as "U-NPSS" may be sub-frames in which a NPSS and/or U-NPSS is transmitted. In addition, the sub-frames labeled as "U-NSSS" may be sub-frames in which an NSSS and/or U-NSSS is transmitted. In addition, the sub-frames labeled as "U-NPBCH" may be sub-frames in which a U-NPBCH and/or NPBCH is transmitted. The examples 1100, 1120, 1140 may be examples of DRS structure, although the scope of embodiments is not limited in this respect.

In some embodiments, the U-NPSS and U-NSSS, and U-NPBCH can be alternated, or swapped, as shown in the examples in FIG. 11. In some cases, this may be useful for purposes such as reduction of the magnitudes of false peaks at multiple of 2 ms. In some embodiments, only the U-NPSS and U-NPSS repetitions are alternated, while U-NPBCH is carried at the end soon after the two synchronization signals.

In some embodiments, a system may support multiple anchor channels. In some embodiments, one or more of the anchor channels may be for initial synchronization and may carry multiple repetitions of U-NPSS/U-NSSS (for instance, $Z=8$ and $Y=2$) and NPBCH (for instance, $X=10$), and may also include SIB information. In some embodiments, one or more of the other anchor channels may be used by UEs 102 in IDLE mode to resynchronize. In this last case, since the UE 102 may already have knowledge of the PCI, and may be subject to an attenuated timing ambiguity, the UE 102 may require fewer repetitions of U-NPSS and U-NSSS to resynchronize, and the rest of the subframes can be used for downlink or uplink transmissions. In some cases, including but not limited to the previously described case, the anchor channel for resynchronization may carry fewer U-NPSS and U-NSSS signals (for instance, $Z=7$ and $Y=3$ or $Z=4$ and $Y=1$). In some embodiments, for cases in which the anchor channel is utilized for initial synchronization, one of the structure described above may be used. In some embodiments, for cases in which the anchor channel is utilized for re-synchronization, only U-NPSS and U-NSSS are carried. In this case, in some embodiments, a number of U-NPSS may be different than a number of U-NSSS. For instance, Z repetitions of U-NPSS may be used and Y repetitions of U-NSSS may be used. Examples may include, but are not limited to one or more of the following: $Z=4$, and $Y=1$; $Z=7$, and $Y=3$; $Z>Y$ (which may mean that the performance of SS is tight with U-NPSS, although the scope of embodiments is not limited in this respect).

In some embodiments, for cases in which the anchor channels are used for re-synchronization, no U-NPBCH is transmitted. In some embodiments, the U-NPSS repetitions may be followed by U-NSSS repetitions.

In some embodiments, an OCC may be applied to the U-NPSS. The OCC may be applied to the U-NPSS in order to improve the detection probability in high frequency offset, although the scope of embodiments is not limited in this respect.

In some embodiments, an OCC may be applied to U-NSS. In some embodiments, two orthogonal OCCs of length-14 may be used. In a non-limiting example, one OCC may be applied to odd U-NPSS repetitions and the other OCC may be applied to even U-NPSS repetitions. A non-limiting example is shown in FIG. 12. In a non-limiting example, the two OCC may be: OCC1=[−1 1 −1 1 −1 −1 1 1 1 −1 1 1 1 −1], and OCC2=[−1 1 1 1 1 1 −1 −1 1 1 1 1 1 1]. Embodiments are not limited to usage of either of these two sequences. Any suitable sequences may be used, including one or more of OCC1 and OCC2 given above.

In some embodiments, a long OCC may be designed such that it has a very sharp and narrow autocorrelation around the center, and very small side peaks.

In some embodiments, a sequence may have a length of 14*Z. The parameter Z may be a number of U-NPSS required, although the scope of embodiments is not limited in this respect. Non-limiting examples for different values of Z are given below. Embodiments are not limited to these example sequences, as any suitable sequences may be used. Embodiments are not limited to these values of Z, as any suitable values of Z may be used.

For $Z=2$, a non-limiting example is OCC=[−1,1,1,−1,−,−1,−1,−1,−1,1,−1,1,−1,−1,1,1,1,1,−1,−1,−1,−1,1,1,1,1,−1,−1,−1,−1,−1].

For $Z=7$, a non-limiting example is [−1,−1,−1,−1,−1,1,−1,−1,−1,1,−1,−1,1,1,1,1,−1,−1,−1,−1,1,1,1,1,1,−1,1,1,1,−1,1,1,−1,−1,1,1,−1,−1,−1,−1,−1,−1,−1,−1,−1,−1,1,1,−1,1,1,1,1,−1,−1,1,1,−1,−1,1,1,−1,−1,1,−1,−1,1,1,−1,−1,1,1,1,1,1,1,−1,1,−1,1,1,1,1,1,1,−1,−1,−1,−1,1,1,−1,1,1,1,1,1,−1,−1,−1,−1].

For $Z=8$, a non-limiting example is OCC=[−1, −1, −1, 1, 1, 1, −1, 1, 1, 1, −1, 1, −1, 1, 1, −1, 1, 1, −1, 1, 1, −1, −1, −1, 1, 1, 1, 1, −1, 1, 1, −1, −1, 1, −1, 1, −1, −1, −1, 1, −1, −1, −1, 1, 1, −1, 1, 1, −1, −1, 1, 1, 1, 1, 1, 1, −1, 1, 1, 1, −1, −1, 1, 1, 1, 1, 1, −1, −1, −1, −1, 1, −1, 1, −1, 1, −1, 1, −1, −1, −1, 1, −1, 1, −1, −1, −1, −1, 1, 1, 1, 1, 1, −1, 1, 1, 1, −1, 1, 1, −1,−1, 1, −1, 1, −1, −1, 1, −1].

For $Z=16$, a non-limiting example is OCC=[−1, −1, −1, −1, 1, −1, −1, 1, 1, −1, −1, −1, −1, 1, 1, 1, −1, −1, −1, 1, −1, 1, 1, −1, 1, −1, −1, 1, 1, 1, −1, 1, −1, 1, 1, −1, 1, 1, −1, 1, 1, 1, −1, 1, −1, 1, −1, −1, 1, 1, −1, 1, 1, 1, −1, −1, 1, −1 −1, 1, 1, 1, −1, −1, 1, −1, 1, 1, 1, −1, 1, 1, −1, 1, 1, −1, 1, 1, −1, 1, 1, −1, −1, 1, 1, −1, −1, −1, −1, 1, −1, 1, −1, −1, 1, 1, −1, −1, −1, 1, −1, 1, 1, 1, 1, −1, −1, −1, −1, 1, 1, 1, −1, 1, 1, −1, 1, 1, −1, −1, 1, −1, 1, −1, −1, 1, −1, −1, 1, 1, 1, 1, 1, −1, −1, 1, 1, 1, 1, 1, −1, 1, 1, −1, −1, 1, 1, 1, 1, −1, −1, 1, 1, 1, −1, 1, −1, −1, 1, 1, 1, −1, 1, 1, 1, −1, −1, −1, 1, −1, −1, 1, 1, 1, −1, 1, 1, −1, 1, 1, 1, −1, −1, −1, −1, 1, −1, 1, 1, 1, −1, 1, 1, 1, 1, 1, −1, −1, 1, −1, −1, 1, 1, 1, 1, 1, −1, −1, 1].

For $Z=32$, a non-limiting example is OCC=[1, 1, −1, 1, 1, −1, −1, 1, 1, 1, −1, 1, 1, −1, 1, −1, −1, 1, 1, 1, 1, 1, 1, −1, 1, −1, 1, −1, −1, −1, −1, 1, 1, −1, 1, −1, −1, −1, 1, 1, −1, −1, −1, 1, 1, 1, −1, 1, 1, −1, −1, −1, 1, −1, 1, −1, −1, 1, 1, −1, 1, 1, 1, 1, −1, −1, −1, 1, −1, 1, −1, 1, −1, −1, 1, −1, −1, 1, 1, 1, −1, −1, 1, 1, −1, −1, 1, 1, 1, 1, −1, −1, −1, 1, −1, 1, −1, 1, −1, 1, 1, 1, −1, −1, −1, 1, −1, 1, −1, −1, 1, 1, 1, −1, −1, 1, 1, 1, −1, 1, 1, −1, 1, −1, −1, −1, −1, −1, −1, 1, 1, 1, 1, −1, 1, 1, −1, −1, −1, 1, 1, 1, −1, 1 −1, 1, −1, 1, −1, −1, 1, 1, −1, 1, 1, −1, −1, −1, −1, 1, −1, −1, −1, 1, 1, 1, 1, 1, 1, −1, 1, 1, 1, −1, −1, −1, −1, −1, 1, −1, −1, −1, −1, 1, −1, −1, 1, 1, 1, −1, 1, 1, −1, −1, −1, −1, −1, 1, −1, 1, 1, 1, −1, −1, −1, 1, −1, 1, −1, 1, 1, 1, −1, −1, −1, 1, −1, −1, 1, 1, 1, −1, 1, −1, −1, 1, −1, 1, 1, −1, 1, 1, 1, −1, 1, −1, 1, −1, 1, 1, 1, −1, 1, −1, −1, −1, 1, 1, −1, 1, 1, 1, 1, 1, −1, 1, −1, −1, 1, 1, −1, −1, 1, −1, −1, −1, 1, 1, −1, 1, −1, −1, −1, −1, 1, −1, −1, −1, 1, 1, −1, 1, 1, 1, 1, −1, −1, 1, 1, −1, −1, −1, −1, 1, −1, 1, −1, 1, 1, 1, 1, −1, 1, −1, 1, 1, 1, 1, −1, −1, −1, 1, 1, −1, 1, 1, 1, 1, −1, −1, 1, 1, −1, −1, −1, −1, −1, 1, −1, 1, 1, 1, 1, −1, 1, −1, 1, 1, −1, −1, −1, −1, 1, 1, −1].

In some embodiments, the OCC may be optimized for both 1Tx and 2Tx transmission by maximizing $\Delta1+\Delta2+\Delta+\Delta4/112$, wherein: $\Delta1$ may be a normalized difference between main peak and 2nd peak of autocorrelation of entire cover code; $\Delta2$ may be a normalized difference between main peak and 2nd peak of autocorrelation for the first half of the entire cover code; $\Delta3$ may be a normalized difference between main peak and 2nd peak of autocorrelation for the second half of the entire cover code; and Δ4 may be a cross-correlation between the first half and. the second half of the entire cover code.

For Z=8, a non-limiting example is OCC=[−1 1 −1 1 −1 1 −1 −1 1 −1 1 1 1 1 −1 1 −1 −1 −1 −1 1 1 1 −1 1 1 1 −1 1 1 −1 1 1 −1 −1 −1 −1 −1 1 −1 −1 1 1 −1 1 1 −1 1 1 1 1 1 −1 1 1 −1 1 1 −1 −1 −1 −1 −1 1 −1 1 1 −1 1 1 −1 1 1 1 1 −1 −1 1 −1 −1 1 1 −1 −1 −1 −1 −1 1 1 1 1 −1 −1 −1 −1 −1 1 −1 −1 1 −1 1 1 1 1 −1 1 −1 1]. Embodiments are not limited to this example sequence, as any suitable sequence may be used.

In some embodiments, the UE 102 may assume that all the REs for transmission of U-NPSS/U-NSSS in a given subframe use the same antenna port. This may be in order to achieve better performance and gain few more dBs from TX diversity, although the scope of embodiments is not limited in this respect.

In some embodiments, the UE 102 may assume that the transmission of U-NPSS/U-NSSS in no more than X consecutive subframes use a same antenna port. Example values of X may include, but are not limited to: 1, 4, 8 and 16. In some embodiments, the UE 102 may assume that the transmission of U-NPSS/U-NSSS in more than X consecutive subframes use a same antenna port. Example values of X may include, but are not limited to: 1, 4, 8 and 16.

In some embodiments, a precoding vector switching (PVS) may be applied with precoding vector [1 1] and [1 −1]. In some embodiments, the PVS scheme may be used for U-NPSS and/or U-NSSS. In some embodiments, for U-NPSS, the precoding vector may change every half of the burst containing all the U-NPSS repetitions, while for U-NSSS the precoding vector may change every subframe including U-NSSS.

In some embodiments, since for NB-IoT-U, the SSS extends over 14 OFDM symbols, the NB-IoT SSS signal may be changed. In some embodiments, the U-NSSS signal may be generated by the following formula. A similar formula, another formula and/or other technique may be used for generation of the U-NSSS signal, in some embodiments.

$$d(n) = b_q(m)e^{-j2\pi\theta_f n}e^{-j\frac{\pi u n'(n'+1)}{167}}$$

$$n = 0, 1, \ldots, 167$$

$$n' = n \bmod 167$$

$$m = n \bmod 160$$

$$u = N_{ID}^{Ncell} \bmod 126 + 3$$

$$q = \left\lfloor \frac{N_{ID}^{Ncell}}{126} \right\rfloor$$

In some embodiments, the binary sequence $b_q(m)$ may be obtained by a length-160 Hadamard sequence that is cyclically shifted. A non-limiting example of a base sequence is given in the table below, with different values of q.

| q | $b_q(0), \ldots, b_q(159)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 −1 1 1 1 1 −1 1 −1 1 −1 −1 1 1 1 −1 1 −1 −1 1 −1 −1 −1 −1 1 1 1 −1 1 1 1 −1 −1 1 1 1 1 −1 1 −1 −1 1 1 −1 1 1 −1 1 −1 −1 −1 1 1 1 −1 1 1 1 −1 −1 1 −1 1 1 −1 1 −1 −1 1 −1 −1 −1 −1 1 1 −1 −1 1 −1 −1 −1 1 1 −1 −1 −1 1 1 1 1 −1 1 −1 1 −1 −1 1 1 1 −1 1 1 1 −1 −1 1 −1 1 1 −1 1 −1 −1 −1 1 1 1 −1 1 1 1 −1 −1 1 −1 1 1 −1 1 1] |
| 2 | [1 −1 −1 −1 −1 1 −1 1 −1 1 1 1 1 −1 1 −1 1 −1 −1 1 1 1 −1 −1 −1 1 −1 1 1 −1 1 1 1 1 1 −1 1 −1 1 −1 −1 −1 1 1 1 1 −1 −1 1 −1 −1 −1 −1 1 1 1 −1 1 1 −1 −1 −1 −1 −1 1 1 −1 1 −1 −1 −1 −1 −1 1 −1 1 −1 −1 −1 −1 1 −1 1 −1 1 −1 1 −1 −1 1 1 −1 1 −1 −1 −1 −1 1 −1 −1 −1 −1 1 −1 1 −1 1 1 1 1 −1 1 1 −1 −1 1 −1 1 −1 −1 1 −1 −1 −1 −1 1 1 −1 1 −1 −1 1 −1 1 1 1 1 1 −1 1 −1 −1 1 1 1 1] |
| 3 | [1 1 1 −1 −1 −1 −1 1 1 −1 1 −1 −1 1 1 1 1 −1 1 −1 1 −1 −1 −1 −1 −1 −1 1 1 1 1 1 −1 1 1 −1 1 1 −1 −1 −1 −1 1 1 1 −1 1 1 1 −1 −1 −1 1 1 1 1 −1 1 1 −1 1 −1 −1 −1 −1 1 1 −1 1 1 1 1 1 1 −1 −1 −1 −1 1 1 −1 1 −1 1 1 1 1 1 1 −1 1 −1 1 1 1 1 1 −1 1 −1 1 1 1 1 1 −1 −1 1 −1 1 −1 1 −1 −1 1 −1 1 −1 1 1 1 1 −1 1 −1 1 1 −1 1 1 1 1 −1 1 −1 1 1 −1 1 −1 1 −1 1 1 −1 1 −1 1 1 −1] |

In some embodiments, a cyclic shift $\theta_f$ may provide a paging indication and baring access. In some embodiments, the cyclic shift $\theta_f$ may assume four values. The following formula and/or similar formula may be used. Embodiments are not limited to usage of this formula:

$$\theta_f = \frac{42}{168}(x+1)$$

In some embodiments, the parameter x may be configured with a two bit field.

In some embodiments, the cyclic shift $\theta_f$ may provide an indication on whether the payload of the MIB has changed or not. In some embodiments, the cyclic shift $\theta_f$ may enable combining across PBCH bursts, and may eliminate in this case any hypothesis testing. In some embodiments, the parameter x may be configured with one bit only, or can be jointly used to carry other information by extending it to two bits. Other values for the number of bits for the parameter x may be used.

In some embodiments, DRS for NB-IoT operating in unlicensed spectrum may be used. In some embodiments, the U-NPSS, U-NSSS, and U-NPBCH may span the 14 OFDM symbols within a subframe. In some embodiments, the U-NPSS may be composed by a ZC sequence of length-11 with a fixed root (including but not limited to 5), and no shift. In some embodiments, the U-NSSS may be a 167-length ZC in order to cover all 14 OFDM symbols. In some embodiments, the U-NSSS may be composed by a concatenation of the legacy NSSS ZC of length-131), and a short ZC sequence of length-35. In some embodiments, multiple repetitions of U-NSSS may follow multiple repetitions of U-NPSS. In some embodiments, each U-NPSS may be followed by a U-NSSS. In some embodiments, the number of U-NPSS repetitions (which may be referred to as Z, without limitation) may be different than the number of repetitions for U-NSSS (which may be referred to as Y, without limitation). In some embodiments, Z>Y, where Z=8 and Y=2. In some embodiments, two orthogonal OCCs of length-14 may be used. One of the OCCs may be applied to odd U-NPSS repetitions and the other OCC may be applied to even U-NPSS repetitions. In some embodiments, a unique and long OCC of length-14*Z may be applied to the Z repetitions of the U-NPSS.

In Example 1, an apparatus of an Evolved Node-B (eNB) may comprise memory. The apparatus may further comprise processing circuitry. The processing circuitry may be configured to encode an unlicensed narrowband primary synchronization signal (U-NPSS) for transmission in a plurality of subframes of 14 orthogonal frequency division multiplexing (OFDM) symbols each. The U-NPSS may be for time synchronization of MulteFire narrowband internet-of-things User Equipment (MF NB-IoT UE). The processing circuitry may be further configured to, for the U-NPSS, for each subframe of the plurality of subframes, and for each of the 14 OFDM symbols of the subframe: repeat a sequence of length-11; and map the sequence to 11 resource elements (REs) of a physical resource block (PRB) of 12 REs. The processing circuitry may be further configured to process the U-NPSS by an orthogonal cover code (OCC) over the plurality of subframes. The OCC may be of length equal to a product of 14 and a number of subframes in the plurality of subframes. The sequence in each of the 14 OFDM symbols of each of the subframes of the plurality of subframes may be multiplied by a different element of the OCC.

In Example 2, the subject matter of Example 1, wherein the processing circuitry may be further configured to encode the U-NPSS for transmission on a same antenna port during each subframe of the plurality of subframes. The processing circuitry may be further configured to encode the U-NPSS for transmission that is restricted to usage of the same antenna port in no more than 4 consecutive subframes.

In Example 3, the subject matter of one or any combination of Examples 1-2, wherein the sequence on which the U-NPSS is based may be a Zadoff-Chu sequence.

In Example 4, the subject matter of one or any combination of Examples 1-3, wherein the sequence on which the U-NPSS is based is a first sequence, and the plurality of subframes is a first plurality of subframes. The processing circuitry may be further configured to encode, for transmission in a second plurality of subframes of 14 OFDM symbols each and further for transmission in the PRB, an unlicensed narrowband secondary synchronization signal (U-NSSS). The processing circuitry may be further configured to, for the U-NSSS, for each subframe of the second plurality of subframes: encode a second sequence of length-167 extended to a sequence of length 168; and map the extended second sequence to the 14 OFDM symbols of the subframe in the 12 REs of the PRB.

In Example 5, the subject matter of one or any combination of Examples 1-4, wherein the second sequence may be a Zadoff-Chu sequence.

In Example 6, the subject matter of one or any combination of Examples 1-5, wherein a root of the Zadoff-Chu sequence may be equal to a sum of: a cell ID taken modulo 126, and the number 3.

In Example 7, the subject matter of one or any combination of Examples 1-6, wherein a size of the first plurality of subframes may be 8 subframes, a size of the second plurality of subframes may be 2 subframes, and the first plurality of subframes may precede the second plurality of subframes.

In Example 8, the subject matter of one or any combination of Examples 1-7, wherein the OCC is a first OCC. The processing circuitry may be further configured to process the U-NSSS, on a per-subframe basis, by a second OCC that is based on a Hadamard code of length-160 extended through a circular shift to a sequence of length-168.

In Example 9, the subject matter of one or any combination of Examples 1-8, wherein the processing circuitry may be further configured to process the U-NSSS by a phase shift equal to 42 divided by 168 multiplied by a sum of 1 and a number. The number may have values of 0, 1, 2, or 3 and may be mapped to a configurable field of two bits. The processing circuitry may be further configured to encode, for transmission, control signaling that indicates the configurable field.

In Example 10, the subject matter of one or any combination of Examples 1-9, wherein the processing circuitry may be further configured to encode the U-NSSS for transmission on a same antenna port during each subframe allocated for U-NSSSs in the second plurality of subframes. The processing circuitry may be further configured to encode the U-NSSS for transmission restricted to usage of different antenna ports in two consecutive subframes. Within subframes allocated for U-NSSSs, used antenna ports may be changed per-subframe.

In Example 11, the subject matter of one or any combination of Examples 1-10, wherein the PRB may be allocated for unlicensed narrowband internet-of-things (NB-IoT-U) operation.

In Example 12, the subject matter of one or any combination of Examples 1-11, wherein the eNB may be arranged to operate in accordance with a MulteFire technique in unlicensed spectrum.

In Example 13, the subject matter of one or any combination of Examples 1-12, wherein the apparatus may include a transceiver to transmit the U-NPSS. The processing circuitry may include a baseband processor to encode the U-NPSS. The memory may be configured to store at least a portion of the U-NPSS.

In Example 14, a non-transitory computer-readable storage medium may store instructions for execution by processing circuitry of a MulteFire narrowband internet-of-things User Equipment (MF NB-IoT UE). The operations may configure the processing circuitry to detect an unlicensed narrowband primary synchronization signal (U-NPSS) that spans a first plurality of subframes of 14 orthogonal frequency division multiplexing (OFDM) symbols each. In each subframe of the first plurality of subframes, the U-NPSS may be based on a sequence of length-11 repeated in each of the 14 OFDM symbols of the subframe. The operations may further configure the processing circuitry to determine, based on detection of the U-NPSS, a second plurality of subframes to monitor for an unlicensed narrowband secondary synchronization signal (U-NSSS). The operations may further configure the processing circuitry to detect the U-NSSS, wherein the U-NSSS may span a second plurality of subframes of 14 OFDM symbols each. In each subframe of the second plurality of subframes, the U-NSSS may be based on a second sequence of length-167 extended to a sequence of length-168. The extended second sequence may be mapped to the 14 OFDM symbols of the subframe in the 12 REs of the PRB. The operations may further configure the processing circuitry to determine a timing synchronization based on detection of the U-NSSS.

In Example 15, the subject matter of Example 14, wherein a size of the first plurality of subframes may be 8. A size of the second plurality of subframes may be 2. The operations may further configure the processing circuitry to detect the U-NPSS in accordance with an orthogonal cover code (OCC) of length equal to a product of 14 and the size of the first plurality of subframes.

In Example 16, the subject matter of one or any combination of Examples 14-15, wherein the operations may further configure the processing circuitry to detect the U-NPSS based on: a same antenna port for the U-NPSS within a subframe of the first plurality of subframes, and a restriction that the same antenna port is used in no more than 4 consecutive subframes. The operations may further configure the processing circuitry to detect the U-NSSS based on: a same antenna port for the U-NSSS within a subframe of the second plurality of subframes, and a restriction that the antenna ports used in consecutive subframes alternate between two values.

In Example 17, the subject matter of one or any combination of Examples 14-16, wherein the first and second sequences may bee Zadoff-Chu sequences.

In Example 18, an apparatus of an Evolved Node-B (eNB) may comprise memory. The apparatus may further comprise processing circuitry. The processing circuitry may be configured to encode, for transmission, an unlicensed narrowband primary synchronization signal (U-NPSS) that spans a first plurality of subframes of 14 orthogonal frequency division multiplexing (OFDM) symbols each. The processing circuitry may be further configured to encode, for transmission in each subframe of the first plurality of subframes. The U-NPSS may be based on a sequence of length-11 repeated in each of the 14 OFDM symbols of the subframe. The processing circuitry may be further configured to encode, for transmission, an unlicensed narrowband secondary synchronization signal (U-NSSS) that spans a second plurality of subframes of 14 OFDM symbols each. The processing circuitry may be further configured to encode the U-NSSS for transmission in each subframe of the second plurality of subframes based on a second sequence of length-167 extended to a sequence of length-168. The processing circuitry may be further configured to map the extended second sequence to the 14 OFDM symbols of the subframe.

In Example 19, the subject matter of Example 18, wherein the processing circuitry may be further configured to encode, for transmission, an unlicensed narrowband physical broadcast channel (U-NPBCH) that spans the 14 OFDM symbols of the subframe.

In Example 20, the subject matter of one or any combination of Examples 18-19, wherein the processing circuitry may be further configured to process the U-NPSS by an orthogonal cover code (OCC) over the first plurality of subframes. The OCC may be of length equal to a product of 14 and a number of subframes in the first plurality of subframes. The sequence in each of the 14 OFDM symbols of each of the subframes of the first plurality of subframes may be multiplied by a different element of the OCC.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Evolved Node-B (eNB), the apparatus comprising:
   memory; and processing circuitry, configured to:
   encode an unlicensed narrowband primary synchronization signal (U-NPSS) for transmission in a plurality of subframes of 14 orthogonal frequency division multiplexing (OFDM) symbols each, the U-NPSS for time synchronization of MulteFire narrowband internet-of-things User Equipment (MF NB-IoT UE);
   wherein to generate the U-NPSS for each subframe of the plurality, for each of the 14 OFDM symbols of the subframe, the processing circuitry is configured to:
   repeat a sequence of length-11; and
   map the repeated sequence to 11 resource elements (REs) of a physical resource block (PRB) of 12 REs; and
   apply an orthogonal cover code (OCC) to the U-NPSS over the plurality of subframes, wherein the OCC is of length equal to a product of 14 and a number of subframes in the plurality of subframes, wherein the sequence in each of the 14 OFDM symbols of each of the subframes of the plurality of subframes is multiplied by a different element of the OCC.

2. The apparatus according to claim 1, wherein:
   encode the U-NPSS for transmission on a same antenna port during each subframe of the plurality of subframes, and
   encode the U-NPSS for transmission that is restricted to usage of the same antenna port in no more than 4 consecutive subframes.

3. The apparatus according to claim 1, wherein the sequence on which the U-NPSS is based is a Zadoff-Chu sequence.

4. The apparatus according to claim 1, wherein:
   the sequence on which the U-NPSS is based is a first sequence, and the plurality of subframes is a first plurality of subframes,
   the processing circuitry is further configured to encode, for transmission in a second plurality of subframes of 14 OFDM symbols each and further for transmission in the PRB, an unlicensed narrowband secondary synchronization signal (U-NSSS),
   the processing circuitry is further configured to, for the U-NSSS, for each subframe of the second plurality of subframes:
   encode a second sequence of length-167 extended to a sequence of length 168; and
   map the extended second sequence to the 14 OFDM symbols of the subframe in the 12 REs of the PRB.

5. The apparatus according to claim 4, wherein the second sequence is a Zadoff-Chu sequence.

6. The apparatus according to claim 5, wherein a root of the Zadoff-Chu sequence is equal to a sum of:
   a cell ID taken modulo 126, and
   the number 3.

7. The apparatus according to claim 4, wherein:
   a size of the first plurality of subframes is 8 subframes,
   a size of the second plurality of subframes is 2 subframes, and
   the first plurality of subframes precedes the second plurality of subframes.

8. The apparatus according to claim 4, wherein:
   the OCC is a first OCC, and
   the processing circuitry is further configured to process the U-NSSS, on a per-subframe basis, by a second OCC that is based on a Hadamard code of length-160 extended through a circular shift to a sequence of length-168.

9. The apparatus according to claim 4, the processing circuitry further configured to:
process the U-NSSS by a phase shift equal to 42 divided by 168 multiplied by a sum of 1 and a number, wherein the number takes values of 0, 1, 2, or 3 and is mapped to a configurable field of two bits; and
encode, for transmission, control signaling that indicates the configurable field.

10. The apparatus according to claim 4, the processing circuitry further configured to:
encode the U-NSSS for transmission on a same antenna port during each subframe allocated for U-NSSSs in the second plurality of subframes; and
encode the U-NSSS for transmission restricted to usage of different antenna ports in two consecutive subframes, wherein within subframes allocated for U-NSSSs, used antenna ports are changed per-subframe.

11. The apparatus according to claim 1, wherein the PRB is allocated for unlicensed narrowband internet-of-things (NB-IoT-U) operation.

12. The apparatus according to claim 1, wherein the eNB is arranged to operate in accordance with a MulteFire technique in unlicensed spectrum.

13. The apparatus according to claim 1, wherein:
the apparatus includes a transceiver to transmit the U-NPSS,
the processing circuitry includes a baseband processor to encode the U-NPSS, and
the memory is configured to store at least a portion of the U-NPSS.

14. A non-transitory computer-readable storage medium that stores instructions for execution by processing circuitry of a MulteFire narrowband internet-of-things User Equipment (MF NB-IoT UE), the operations to configure the processing circuitry to:
detect an unlicensed narrowband primary synchronization signal (U-NPSS) that spans a first plurality of subframes of 14 orthogonal frequency division multiplexing (OFDM) symbols each,
wherein in each subframe of the first plurality of subframes, the U-NPSS is based on a sequence of length-11 repeated in each of the 14 OFDM symbols of the subframe;
determine, based on detection of the U-NPSS, a second plurality of subframes to monitor for an unlicensed narrowband secondary synchronization signal (U-NSSS);
detect the U-NSSS, wherein the U-NSSS spans a second plurality of subframes of 14 OFDM symbols each,
wherein in each subframe of the second plurality of subframes, the U-NSSS is based on a second sequence of length-167 extended to a sequence of length-168, the extended second sequence mapped to the 14 OFDM symbols of the subframe in the 12 REs of the PRB; and
determine a timing synchronization based on detection of the U-NSSS.

15. The non-transitory computer-readable storage medium according to claim 14, wherein:
a size of the first plurality of subframes is 8,
a size of the second plurality of subframes is 2, and
the operations further configure the processing circuitry to detect the U-NPSS in accordance with an orthogonal cover code (OCC) of length equal to a product of 14 and the size of the first plurality of subframes.

16. The non-transitory computer-readable storage medium according to claim 14, the operations to further configure the processing circuitry to:
detect the U-NPSS based on:
a same antenna port for the U-NPSS within a subframe of the first plurality of subframes, and
a restriction that the same antenna port is used in no more than 4 consecutive subframes; and
detect the U-NSSS based on:
a same antenna port for the U-NSSS within a subframe of the second plurality of subframes, and
a restriction that the antenna ports used in consecutive subframes alternate between two values.

17. The non-transitory computer-readable storage medium according to claim 14, wherein the first and second sequences are Zadoff-Chu sequences.

18. An apparatus of an Evolved Node-B (eNB), the apparatus comprising:
memory; and processing circuitry, configured to:
encode, for transmission, an unlicensed narrowband primary synchronization signal (U-NPSS) that spans a first plurality of subframes of 14 orthogonal frequency division multiplexing (OFDM) symbols each,
encode, for transmission in each subframe of the first plurality of subframes, the U-NPSS based on a sequence of length-11 repeated in each of the 14 OFDM symbols of the subframe;
encode, for transmission, an unlicensed narrowband secondary synchronization signal (U-NSSS) that spans a second plurality of subframes of 14 OFDM symbols each;
encode the U-NSSS for transmission in each subframe of the second plurality of subframes based on a second sequence of length-167 extended to a sequence of length-168; and
map the extended second sequence to the 14 OFDM symbols of the subframe.

19. The apparatus according to claim 18, the processing circuitry further configured to:
encode, for transmission, an unlicensed narrowband physical broadcast channel (U-NPBCH) that spans the 14 OFDM symbols of the subframe.

20. The apparatus according to claim 19, the processing circuitry further configured to:
process the U-NPSS by an orthogonal cover code (OCC) over the first plurality of subframes,
wherein the OCC is of length equal to a product of 14 and a number of subframes in the first plurality of subframes,
wherein the sequence in each of the 14 OFDM symbols of each of the subframes of the first plurality of subframes is multiplied by a different element of the OCC.

* * * * *